United States Patent
Zhang et al.

(10) Patent No.: US 12,375,965 B2
(45) Date of Patent: Jul. 29, 2025

(54) CROSS-LINK INTERFERENCE (CLI) DETECTION AND MITIGATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

( * ) Notice: Subject to any disclaimer, the term of this patent is extended or adjusted under 35 U.S.C. 154(b) by 347 days.

(21) Appl. No.: 17/888,134

(22) Filed: Aug. 15, 2022

(65) Prior Publication Data

US 2024/0056857 A1 Feb. 15, 2024

(51) Int. Cl.
*H04W 24/10* (2009.01)
*H04W 72/541* (2023.01)

(52) U.S. Cl.
CPC ......... *H04W 24/10* (2013.01); *H04W 72/541* (2023.01)

(58) Field of Classification Search
None
See application file for complete search history.

(56) References Cited

U.S. PATENT DOCUMENTS

| | | | | |
|---|---|---|---|---|
| 2020/0068577 A1* | 2/2020 | Xie | ........... | H04W 72/23 |
| 2020/0112420 A1* | 4/2020 | Xu | ........... | H04L 5/0073 |
| 2020/0322962 A1* | 10/2020 | Wang | ........... | H04W 72/21 |
| 2020/0389805 A1* | 12/2020 | Kim | ........... | H04W 24/10 |
| 2020/0412433 A1* | 12/2020 | Zhou | ........... | H04B 7/0695 |
| 2021/0050983 A1* | 2/2021 | Manolakos | ........... | H04W 24/10 |
| 2021/0185654 A1* | 6/2021 | Taherzadeh Boroujeni | | H04W 72/541 |
| 2021/0368371 A1* | 11/2021 | Wang | ........... | H04L 5/0073 |
| 2023/0071471 A1* | 3/2023 | Park | ........... | H04B 17/318 |
| 2023/0101464 A1* | 3/2023 | Fakoorian | ........... | H04L 5/14 370/280 |
| 2023/0413088 A1* | 12/2023 | Sedin | ........... | H04W 24/08 |

FOREIGN PATENT DOCUMENTS

EP    3984316 B1 *   4/2022   ........... H04B 17/318

* cited by examiner

*Primary Examiner* — Faruk Hamza
*Assistant Examiner* — Cassandra L Decker

(57) ABSTRACT

Disclosed are systems, apparatuses, processes, and computer-readable media to detect and mitigate cross link interference (CLI). A method of a wireless communication at a first user equipment (UE), comprises determining, at the first UE, a communication failure on a downlink (DL) channel indicative of CLI from transmission of a communications signal by a second UE on an uplink (UL) channel; based on detecting the communication failure, transmitting a request for CLI measurement resources to a network entity; receiving, at the first UE, a CLI reference signal configuration from the network entity; receiving, at the first UE, a CLI reference signal from the second UE; and transmitting, to the network entity, a CLI measurement report based on the CLI reference signal.

15 Claims, 13 Drawing Sheets

Standard (TS 38.213) table of slot format

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| ... | ... | ... | ... | ... | ... | ... | ... | ... | ... | ... | ... | ... | ... | ... |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | F | U |
| ... | ... | ... | ... | ... | ... | ... | ... | ... | ... | ... | ... | ... | ... | ... |
| 54 | F | D | D | D | D | D | F | U | U | U | D | D | D | D |
| 55 | D | D | F | F | F | F | U | U | D | D | D | D | D | D |
| 56 – 254 | Reserved | | | | | | | | | | | | | |
| 255 | UE determines the slot format for the slot based on semi-static TDD UL/DL configuration and, if any, on detected DCI formats | | | | | | | | | | | | | |

FIG. 5

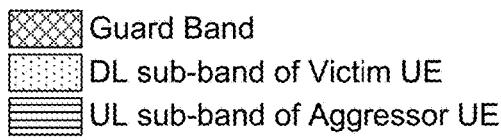
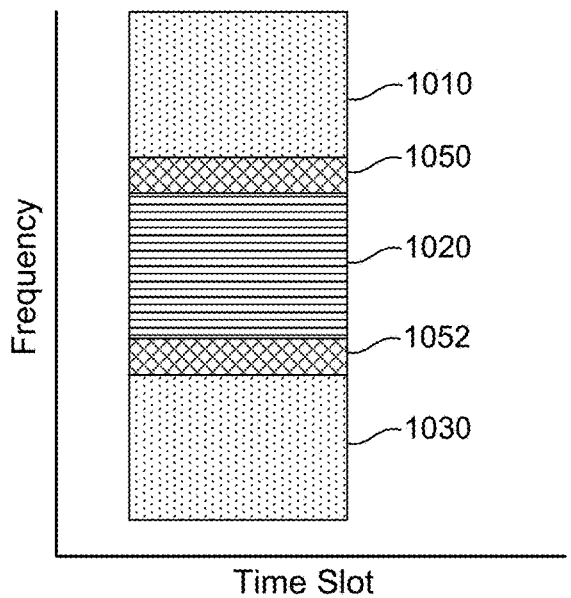
FIG. 10A
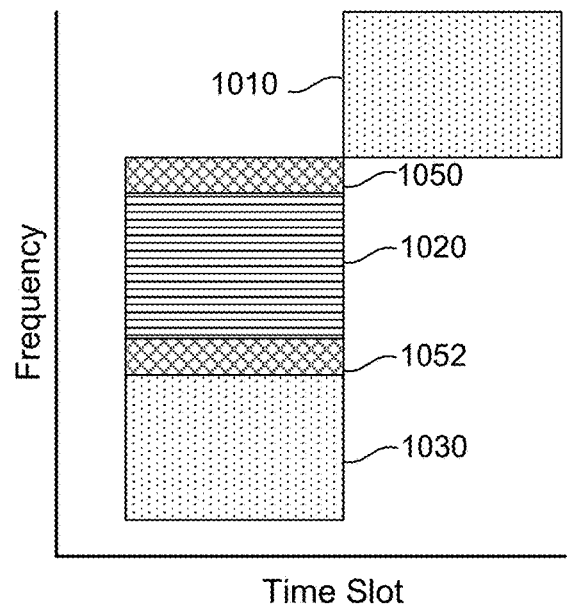
FIG. 10B
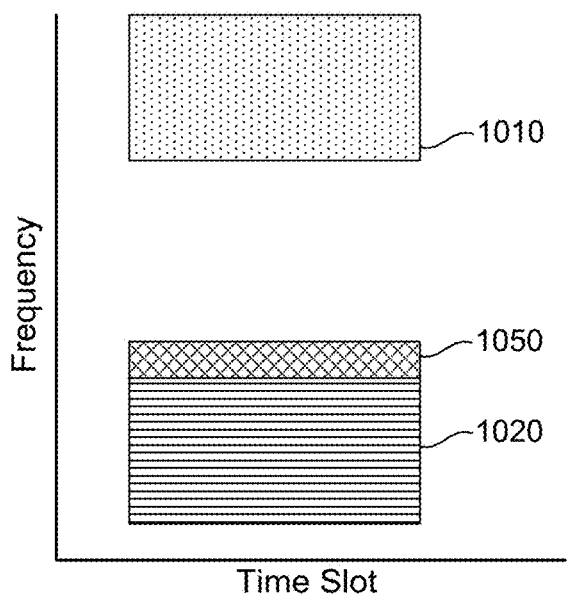
FIG. 10C
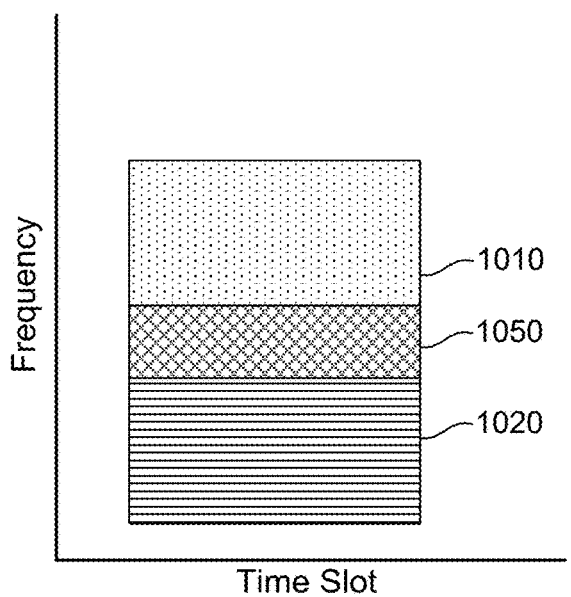
FIG. 10D

CROSS-LINK INTERFERENCE (CLI) DETECTION AND MITIGATION

FIELD OF THE DISCLOSURE

The present disclosure generally relates to wireless communications. For example, aspects of the disclosure relate to systems and techniques for performing cross-link interference (CLI) detection and mitigation.

BACKGROUND OF THE DISCLOSURE

Wireless communications systems are widely deployed to provide various types of communication content, such as voice, video, packet data, messaging, and broadcast. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support communications between UEs, which may involve direct transmissions between two or more UEs.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Wireless multiple-access communications systems may allow uplink transmission from different user equipment (UE) to network entities (e.g., base stations, such as gNodeBs (gNBs), or portions thereof, such as a central unit (CU), a distributed unit (DU), or other portion of a base station having a disaggregated architecture) and downlink reception from network entities to different UEs. In some cases, for a communications system that utilizes time division duplexing (TDD) for communications or another type of duplexing (e.g., full duplexing (FD)), neighboring cells within the communications system may have different configurations (e.g., TDD configurations) that may cause an overlap or interference in conflicting communications (e.g., transmissions and/or receptions). Such interference between an uplink transmission by a first UE (referred to as an aggressor UE) and a downlink reception by a second UE (referred to as a victim UE) is referred to as cross-link interference (CLI), where the victim UE experiences interference in its downlink reception.

Systems and techniques are described for performing CLI detection and mitigation. Disclosed are systems, apparatuses, methods, and computer-readable media for detecting and mitigating CLI. According to at least one example, a method for wireless communication at a first user equipment (UE) is provided that includes: determining, at the first UE, a communication failure on a downlink (DL) channel indicative of CLI from transmission of a communications signal by a second UE on an uplink (UL) channel; based on detecting the communication failure, transmitting a request for CLI measurement resources to a network entity; receiving a CLI reference signal configuration from the network entity; receiving a CLI reference signal from the second UE; and transmitting a CLI measurement report to the network entity based on the CLI reference signal.

In another example, an apparatus of a first user equipment (UE) for wireless communication is provided that includes at least one memory and at least one processor coupled to the at least one memory. The at least one processor is configured to: determine a communication failure on a downlink (DL) channel indicative of cross link interference (CLI) from transmission of a communications signal by a second UE on an uplink (UL) channel; based on detecting the communication failure, transmit a request for CLI measurement resources to a network entity; receive a CLI reference signal configuration from the network entity; receive a CLI reference signal from the second UE; and output, for transmission to the network entity, a CLI measurement report based on the CLI reference signal.

In another example, a non-transitory computer-readable medium of a first UE is provided that has stored thereon instructions that, when executed by one or more processors, cause the one or more processors to: determine a communication failure on a DL channel indicative of CLI from transmission of a communications signal by a second UE on an UL channel; based on detecting the communication failure, transmit a request for CLI measurement resources to a network entity; receive a CLI reference signal configuration from the network entity; receive a CLI reference signal from the second UE; and transmit a CLI measurement report to the network entity based on the CLI reference signal.

In another example, an apparatus of a first UE for wireless communication is provided. The apparatus includes: means for determining a communication failure on a DL channel indicative of CLI from transmission of a communications signal by a second UE on an UL channel; means for based on detecting the communication failure, transmitting a request for CLI measurement resources to a network entity; means for receiving a CLI reference signal configuration from the network entity; means for receiving a CLI reference signal from the second UE; and means for transmitting a CLI measurement report to the network entity based on the CLI reference signal.

In another example, a method for wireless communication at a network entity is provided that includes: receiving a request from a first UE for CLI measurement resources based on a downlink (DL) channel allocated to the first UE; transmitting the CLI measurement resources to a second UE for transmitting a reference signal to the first UE; transmitting the CLI measurement resources to the first UE for receiving a CLI reference signal; receiving a CLI measurement report based on measurement of the CLI reference signal at the first UE; and determining network configuration information for the first UE based on the CLI measurement report.

In another example, an apparatus of a network entity for wireless communication is provided that includes at least one memory and at least one processor coupled to the at least one memory. The at least one processor is configured to: receive a request from a first UE for CLI measurement resources based on a DL channel allocated to the first UE; output the CLI measurement resources for transmission to a second UE for transmitting a reference signal to the first UE; output the CLI measurement resources for transmission to the first UE for receiving a CLI reference signal; receive a CLI measurement report based on measurement of the CLI reference signal at the first UE; and determine network configuration information for the first UE based on the CLI measurement report.

In another example, a non-transitory computer-readable medium is provided that has stored thereon instructions that, when executed by one or more processors, cause the one or more processors to: receive a request from a first UE for CLI measurement resources based on a downlink (DL) channel allocated to the first UE; transmit the CLI measurement resources to a second UE for transmitting a reference signal to the first UE; transmit the CLI measurement resources to the first UE for receiving a CLI reference signal; receive a CLI measurement report based on measurement of the CLI reference signal at the first UE; and determine network configuration information for the first UE based on the CLI measurement report.

In another example, an apparatus for wireless communication is provided. The apparatus includes: means for receiving a request from a first UE for CLI measurement resources based on a downlink (DL) channel allocated to the first UE; means for transmitting the CLI measurement resources to a second UE for transmitting a reference signal to the first UE; means for transmitting the CLI measurement resources to the first UE for receiving a CLI reference signal; means for receiving a CLI measurement report based on measurement of the CLI reference signal at the first UE; and means for determining network configuration information for the first UE based on the CLI measurement report.

In some aspects, the apparatus is, or is part of, a mobile device (e.g., a mobile telephone or so-called "smart phone" or other mobile devices), a wearable device, an extended reality (XR) device (e.g., a virtual reality (VR) device, an augmented reality (AR) device, or a mixed reality (MR) device), a personal computer, a laptop computer, a tablet computer, an Internet-of-Things (IoT) device, a wireless access point, a vehicle or component of a vehicle, a server computer, a robotics device, or other device. In some aspects, the apparatus includes radio detection and ranging (radar) for capturing radio frequency (RF) signals. In some aspects, the apparatus includes light detection and ranging (LIDAR) for capturing optical frequency signals. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 5 is a diagram illustrating an example of a slot format table, which may be employed by the disclosed systems and techniques for a CLI cancellation, in accordance with some aspects;

FIG. 10A illustrates allocation of resources in single band full duplex (SBFD) operation of an aggressor UE and a victim UE according to various aspects of the disclosure;

FIGS. 10B, 10C, and 10D illustrate allocation of resources in SBFD operation after performing mitigation according to various aspects of the disclosure;

DETAILED DESCRIPTION

Figure 1:
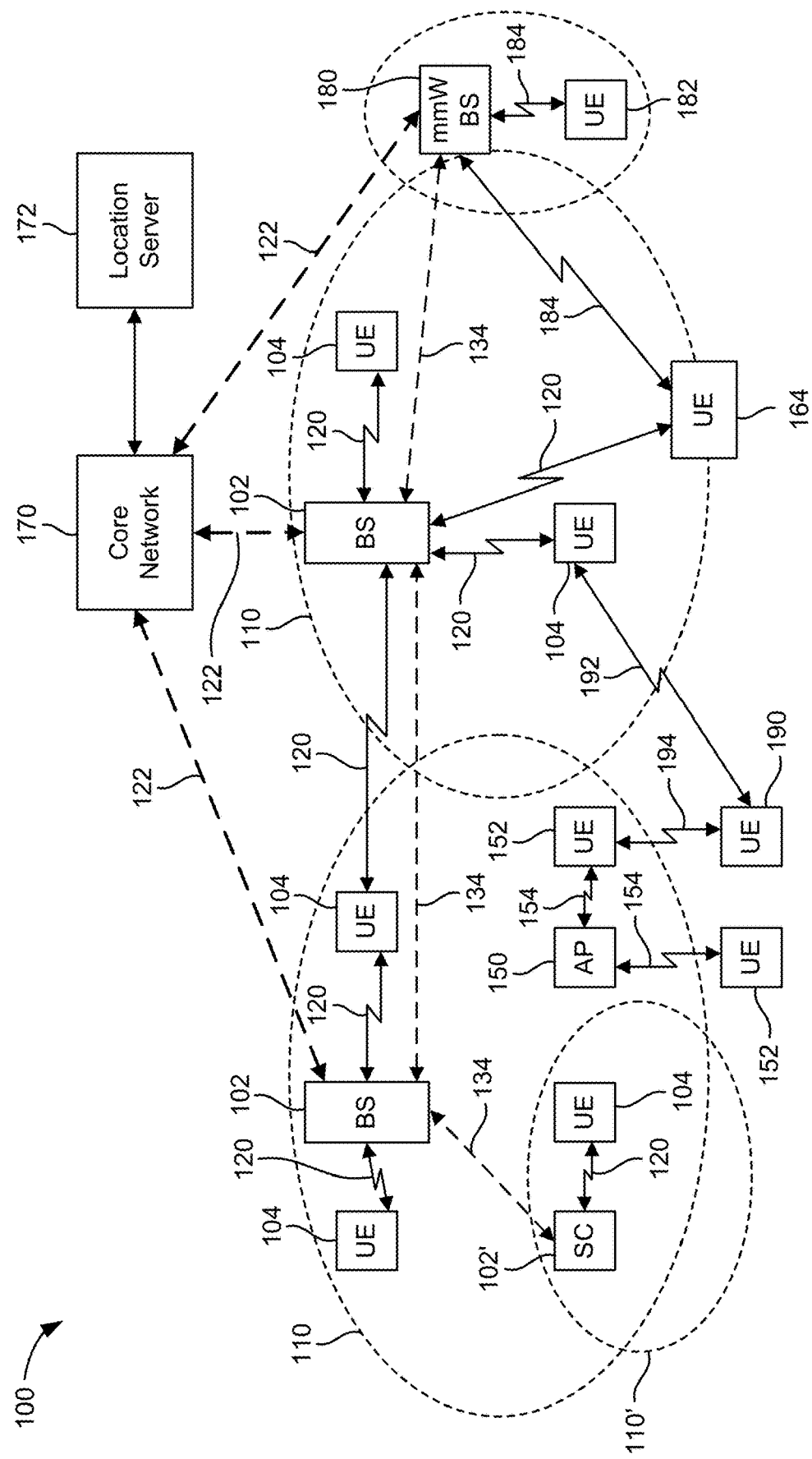
FIG. 1 is a block diagram illustrating an example of a wireless communication network that may be employed by the disclosed systems and techniques for cross link interference (CLI) measurement, in accordance with some aspects.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

A wireless multiple-access communications system may employ various techniques for performing uplink transmission from and downlink reception to different user equipment (UE). In one illustrative example, a communications system may utilize time division duplexing (TDD) for communications. In some cases, neighboring cells within the system may have different TDD configurations that may cause an overlap in conflicting communications, including between transmissions and/or receptions to and from UEs. For example, an uplink transmission by a first UE may interfere (overlap) with a downlink reception by a second UE if the uplink transmission and the downlink reception are scheduled to use the same frequency at the same time. In another illustrative example, a communications system may utilize full duplexing (FD), which can also lead to interference between transmissions and receptions from and to UEs. This type of interference between an uplink transmission by a first UE (an aggressor UE) and a downlink reception by a second UE (a victim UE) is referred to as cross-link interference (CLI).

Systems, apparatuses, processes (also referred to as methods), and computer-readable media (collectively referred to herein as systems and techniques) are described herein that employ CLI detection and mitigation. In some aspects, a first UE (e.g., a victim UE) may determine a communication failure on a downlink (DL) channel indicative of CLI from transmission of a communications signal by a second UE (e.g., an aggressor UE) on an uplink (UL) channel. As described in more detail herein, the communication failure indicative of CLI can be based on failing to properly decode communications (e.g., data or control information) on a channel (e.g., a physical downlink shared channel (PDSCH), a physical downlink control channel (PDCCH), etc.) while measurement of a reference signal indicates that the signals from a network entity (e.g., a next generation Node B (gNB) or portion thereof, etc.) should be correctly decoded (e.g., based on a received power level of the reference signal being greater than a minimum power threshold).

The determination that the communication failure on the DL channel is indicative of CLI may trigger the first UE to transmit communications to the network entity requesting the network entity to configure inter-UE (e.g., subband) CLI measurement resources (e.g., a reference signal for the second UE or other UE to send to the first UE for CLI measurements) and request for the network entity to configure reporting resources (e.g., for the first UE to transmit a CLI measurement report). For instance, the second (aggressor) UE may transmit a reference signal (e.g., an uplink demodulation reference signal (DMRS), a sounding reference signal (SRS), etc.) to the first UE. The first UE can measure the CLI reference signal and provide information (e.g., a CLI measurement report) to the network entity that informs the presence and/or extent of CLI.

According to various aspects described herein, in response to the information (e.g., the CLI measurement report), the network entity can configure the victim UE based on the various aspects described below in consideration of other UEs and resources so that the victim UE can avoid the aggressor UE and receive downlink data. In some cases, for example, the network entity may determine configuration information for mitigating the CLI, such as transmitting network configuration information to the first UE including an indication of a third UE for pairing with the first UE for duplex communications, an indication of at least one guard band between a DL sub-band associated with the DL channel of the first UE and an UL sub-band associated with the UL channel transmitted by the second UE, and indication of a different frequency sub-band with lower CLI for receiving one or more communication signals on the DL channel, and/or other information.

According to various aspects, the UE can identify the presence of CLI based on certain events or triggers (e.g., determination that the communication failure on the DL channel is indicative of CLI), which can prevent the need for persistent monitoring of network channels for CLI and thus preserve compute resources and power. Although the various aspects described below are related to detection of network failures in the uplink direction.

Additional details regarding the disclosed systems and methods for providing CLI cancellation, as well as specific implementations, are described below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an UL channel (e.g., a reverse traffic channel, a reverse control channel, an access channel, etc.). A communication link through which the base station can send signals to UEs is called a DL or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example of a wireless communications system 100 that may be employed by the disclosed systems and techniques for CLI cancellation, according to various aspects. The wireless communications system 100 (which may also be referred to as a wireless wide area network (WWAN)) may include various base stations 102 and various UEs 104. As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof.

The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), intra-cell interference coordination, inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5 GC) over backhaul links 134, which may be wired and/or wireless.

The base stations 102 may wirelessly communicate with the UEs 104. Each of the base stations 102 may provide communication coverage for a respective geographic coverage area 110. In one illustrative example, one or more cells may be supported by a base station 102 in each coverage area 110. A "cell" is a logical communication entity used for communication with a base station (e.g., over some frequency resource, referred to as a carrier frequency, component carrier (CC), carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 and geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 (e.g., access links) between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies can be referred to as the FR2 band (e.g., including a frequency range of 24250 MHz to 52600 MHz). In some examples, the wireless communications system 100 can include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connect indirectly to one or more communication networks via one or more relay devices (e.g., UEs) by using device-to-device (D2D) peer-to-peer (P2P) links (referred to as "sidelinks"). In the example of FIG. 1, UE 190 has a D2D P2P link 192 with one of the UEs 104, which can be configured to operate as a relay device (e.g., through which UE 190 may indirectly communicate with base station 102). In another example, UE 190 also has a D2D P2P link 194 with WLAN STA 152, which is connected to the WLAN AP 150 and can be configured to operate as a relay device (e.g., UE 190 may indirectly communicate with AP 150). In an example, the D2D P2P links 192 and 194 may be supported with any well-known D2D RAT, such as LTE Direct (LTE-D), Wi-Fi Direct (Wi-Fi-D), Bluetooth®, UWB, and so on.

As noted above, UE 104 and UE 190 can be configured to communicate using sidelink communications. In some examples, UE 104 and UE 190 can operate using one or more different modes for sidelink communications. For example, in mode 1 the cellular network (e.g., base station 102) can select and manage the radio resources used by the UEs for performing sidelink communications. In another example, the UE 104 and UE 190 can be configured to operate using mode 2 in which the UEs can autonomously select the radio resources for sidelink communications. Mode 2 can operate without cellular coverage, and in some cases can be considered a baseline sidelink communications mode as devices and/or applications may not depend on the availability of cellular coverage. In some examples, mode 2 can include a distributed scheduling scheme for UEs to select radio resources.

In some aspects, UE 104 and UE 190 can be configured to implement a multi-beam unicast link for sidelink communications. In some examples, UE 104 and UE 190 can use PC5 radio resource control (RRC) protocol to establish and maintain a multi-beam unicast link that can be used for sidelink communications. In some cases, a sidelink transmission can include a request for feedback (e.g., a hybrid automatic repeat request (HARQ)) from the receiving UE. In some instances, the feedback request can be included in the sidelink control information (SCI) (e.g., SCI 1 in Physical Sidelink Control Channel (PSCCH) and/or SCI 2 in Physical Sidelink Shared Channel (PSSCH)). In some aspects, the feedback can correspond to an acknowledgement (ACK) or a negative acknowledgement (NACK).

In some examples, a transmitting UE (e.g., UE 104 and/or UE 190) can use feedback information to select and/or perform beam maintenance of beam pairs associated with a unicast link for sidelink communications. For example, a transmitting UE can maintain one or more counters associated with one or more beam pairs and/or one or more component beams. In some aspects, the counters can be used to determine the reliability of a component beam and/or a beam pair. In some cases, a transmitting UE may increment a counter for a beam pair and/or a component beam based on a discontinuous transmission (DTX). For example, a transmitting UE may increment a counter for a component beam and/or a beam pair if it does not receive any response to a request for feedback for an associated sidelink transmission (e.g., receiving UE fails to decode SCI). In another example, a transmitting UE may increment a counter for a component beam and/or a beam pair if it receives a NACK in response to a sidelink transmission.

In some cases, a transmitting UE may initiate beam refinement based on a value of a counter corresponding to a number of DTXs associated with a component beam and/or a beam pair. In some aspects, a transmitting UE may initiate beam recovery based on a value of a counter corresponding to a number of DTXs associated with a component beam and/or a beam pair. In some examples, a transmitting UE may detect radio link failure (RLF) based on a value of a counter corresponding to a number of DTXs associated with a component beam and/or a beam pair.

Figure 2:
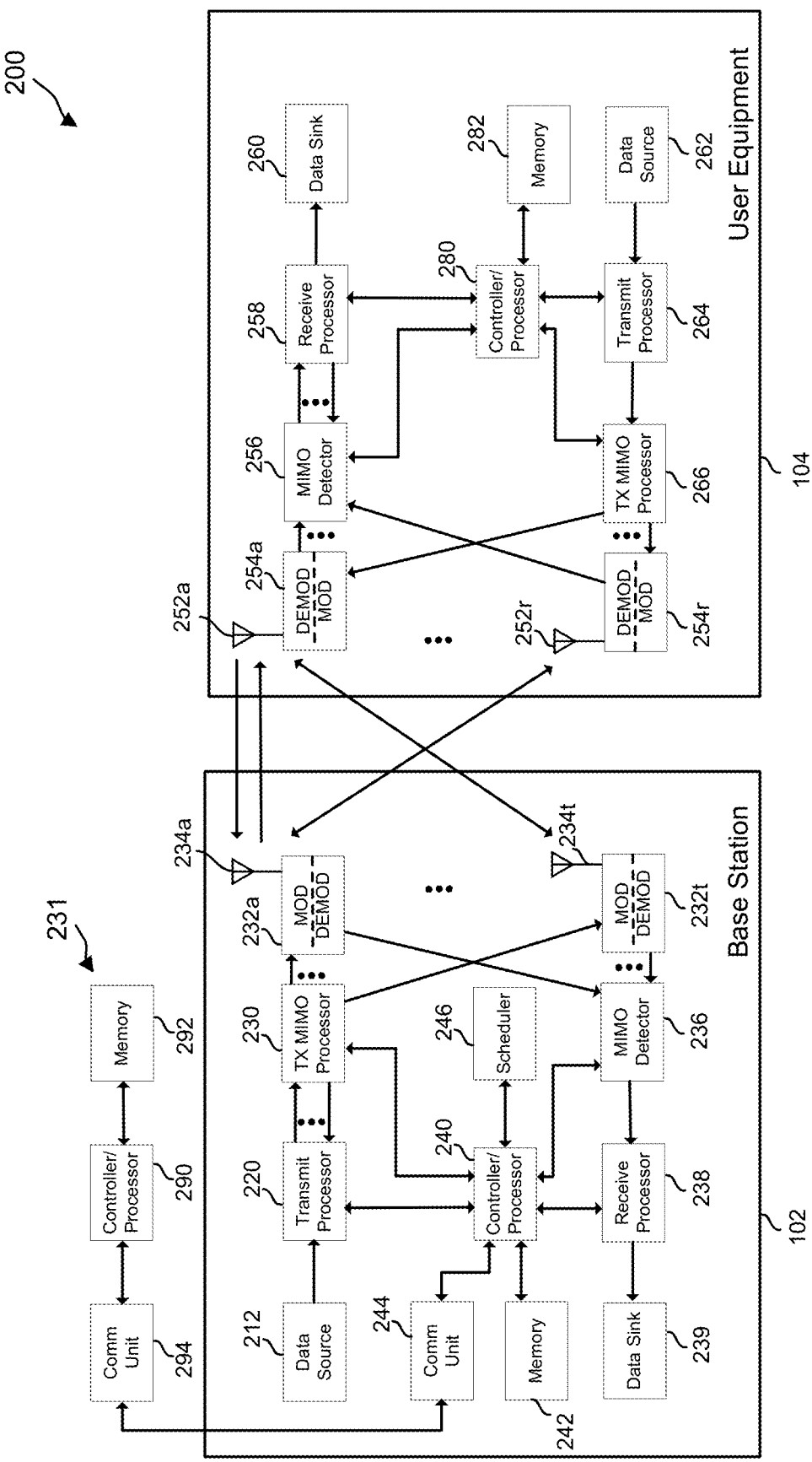
FIG. 2 is a diagram illustrating a design of a base station and a user equipment (UE) device that enable transmission and processing of signals exchanged between the UE and the base station, which may be employed by the disclosed systems and techniques for CLI cancellation, in accordance with some aspects.

FIG. 2 shows a block diagram of a design of a base station 102 and a UE 104 that enable transmission and processing of signals exchanged between the UE and the base station, which may be employed by the disclosed systems and techniques for CLI cancellation, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) MIMO processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined MOD-DEMOD. In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), CQI, and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with providing CLI cancellation.

Memories 242 and 282 may store data and program codes for the base station 102 and the UE 104, respectively. A scheduler 246 may schedule UEs for data transmission on the downlink, uplink, and/or sidelink.

In some implementations, the UE 104 can include: means for transmitting a CLI cancellation capability; means for transmitting indication of a training phase; means for performing channel estimation; means for receiving assistance information from a network entity; and means performing CLI cancellation. In some examples, the means for receiving can include controller/processor 280, transmit processor 264, TX MIMO processor 266, DEMODs 254a through 254r, antennas 252a through 252r, any combination thereof, or any other component(s) of the UE 104. In some examples, the means for generating can include controller/processor 280, memory 282, receive processor 258, transmit processor 264, any combination thereof, or any other component(s) of the UE 104. In some examples, the means for transmitting can include controller/processor 280, transmit processor 264, TX MIMO processor 266, MODs 254a through 254r, antennas 252a through 252r, any combination thereof, or any other component(s) of the UE 104.

In some implementations, the base station 102 can include: means for receiving, from the UE, a CLI cancellation capability; means for transmitting, to a UE, assistance information; means for receiving, from the UE, indication of a training phase; and means for muting transmission to the UE during the training phase. In some examples, the means for transmitting can include controller/processor 240, transmit processor 220, TX MIMO processor 230, MODs 232a through 232t, antennas 234a through 234t, any combination thereof, or any other component(s) of the base station 102. In some examples, the means for receiving can include controller/processor 240, transmit processor 220, TX MIMO processor 230, DEMODs 232a through 232t, antennas 234a through 234t, any combination thereof, or any other component(s) of the base station 102.

Figure 3:
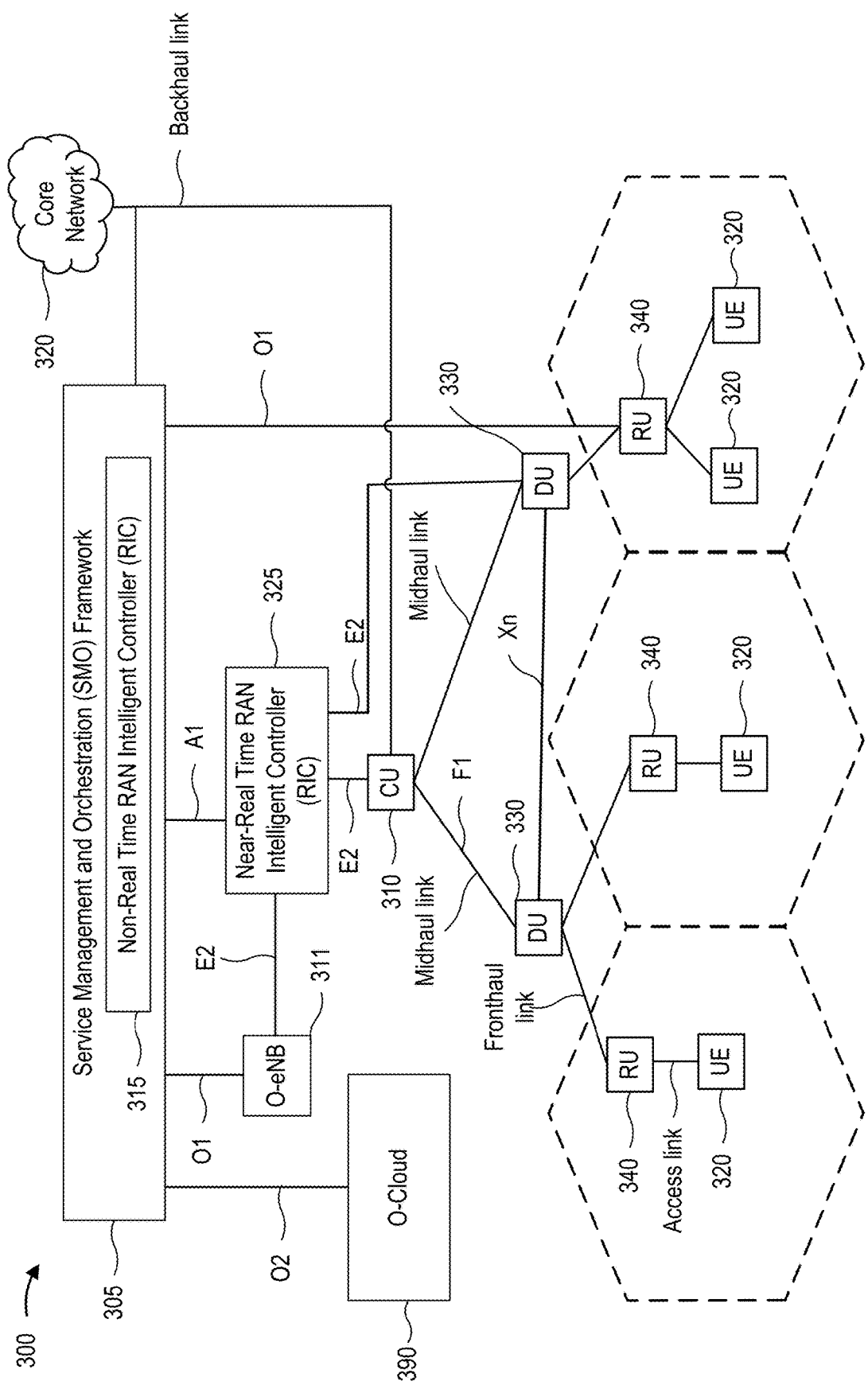
FIG. 3 is a diagram illustrating an example of a disaggregated base station architecture, which may be employed by the disclosed systems and techniques for CLI cancellation, in accordance with some aspects.

FIG. 3 is a diagram illustrating an example of a disaggregated base station 300 architecture, which may be employed by the disclosed systems and techniques for CLI cancellation, in accordance with some examples. Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS), or one or more units (or one or more components) performing base station functionality, may be implemented in an aggregated or disaggregated architecture. For example, a BS (such as an NB, eNB, NR BS, 5G NB, AP, a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 3 shows a diagram illustrating an example disaggregated base station 300 architecture. The disaggregated base station 300 architecture may include one or more CUs 310 that can communicate directly with a core network 320 via a backhaul link, or indirectly with the core network 320 through one or more disaggregated base station units (such as a RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 320 via one or more RF access links. In some implementations, the UE 320 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate bidirectionally with the DU 330 via an interface, such as the F1-C or F1-U interface (referred to collectively herein as "F1"), as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3r d Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310. In some cases, DUs 330 can be implemented to communicate bidirectionally with other DUs 330 via an interface, such as the Xn interface, as necessary, for network control and signaling. In some implementations, DUs 330 can communicate bidirectionally with other DUs 330 via direct over the air (OTA) communication between the DUs.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle OTA communication with one or more UEs 320. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
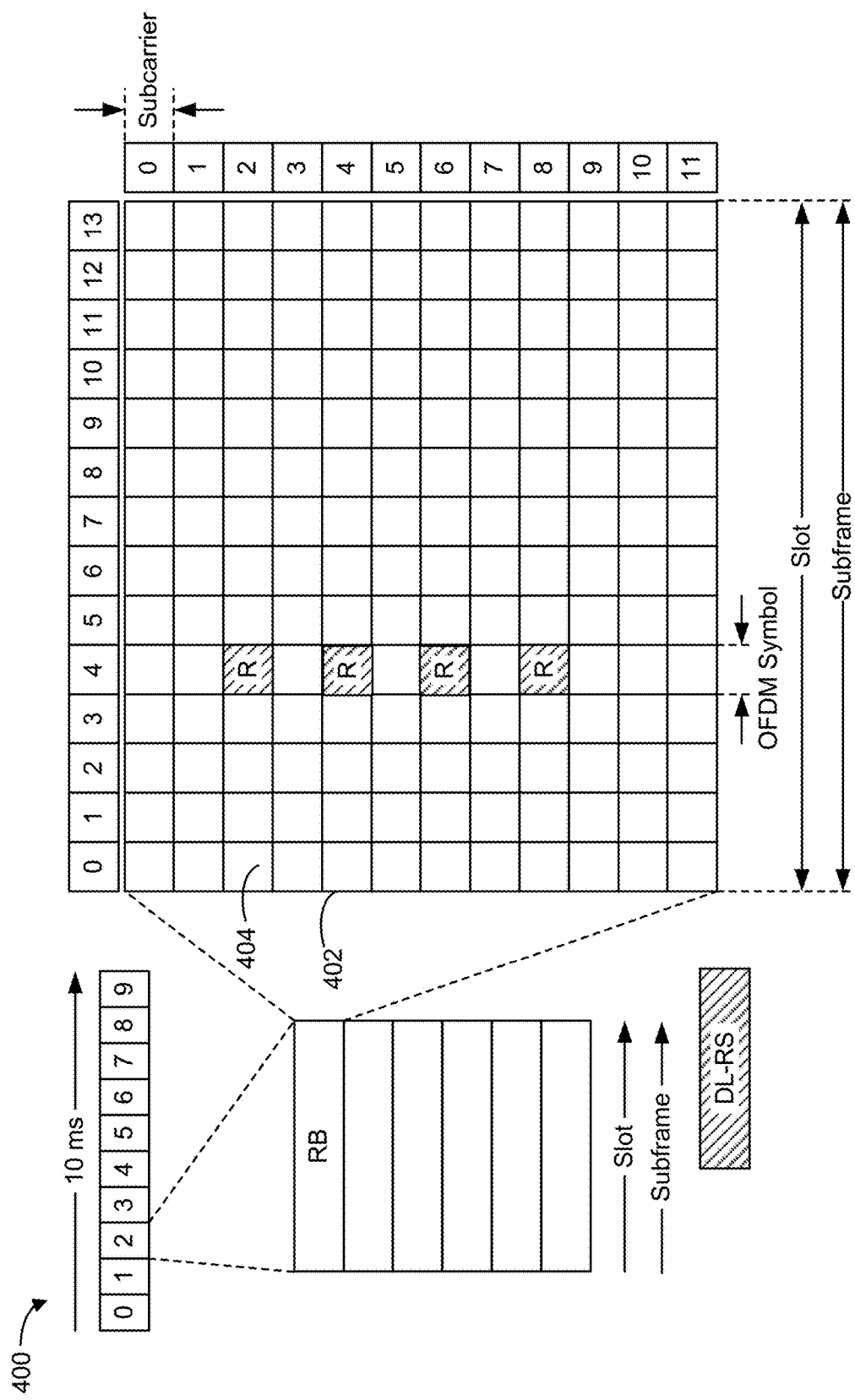
FIG. 4 is a diagram illustrating an example of a frame structure, which may be employed by the disclosed systems and techniques for CLI cancellation, in accordance with some aspects.

Various radio frame structures may be used to support downlink, uplink, and sidelink transmissions between network nodes (e.g., base stations and UEs). FIG. 4 is a diagram 400 illustrating an example of a frame structure, which may be employed by the disclosed systems and techniques for CLI cancellation, according to some aspects of the disclosure. Other wireless communications technologies may have different frame structures and/or different channels.

NR (and LTE) utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

vLTE supports a single numerology (subcarrier spacing, symbol length, etc.). In contrast, NR may support multiple numerologies ($\mu$). For example, subcarrier spacing (SCS) of 15 kHz, 30 kHz, 60 kHz, 120 kHz, and 240 kHz or greater may be available. Table 1 provided below lists some various parameters for different NR numerologies.

TABLE 1

| SCS (kHz) | Symbols/ Sot | Slots/ Subframe | Slots/ Frame | Slot Duration (ms) | Symbol Duration (µs) | Max. nominal system BW (MHz) with 4K FFT size |
|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In one example, a numerology of 15 kHz is used. Thus, in the time domain, a 10 millisecond (ms) frame is divided into 10 equally sized subframes of 1 ms each, and each subframe includes one time slot. In FIG. 4, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent RBs (also referred to as physical RBs (PRBs)) in the frequency domain. FIG. 4 illustrates an example of a resource block (RB) 402. The resource grid is further divided into multiple resource elements (REs). Referring to FIG. 4, the RB 402 includes multiple REs, including the RE 404. The RE 404 may correspond to one symbol length in the time domain and one subcarrier in the frequency domain. In the numerology of FIG. 4, for a normal cyclic prefix, RB 402 may contain 12 consecutive subcarriers in the frequency domain and seven consecutive symbols in the time domain, for a total of 84 REs such as RE 404. For an extended cyclic prefix, an RB may contain 12 consecutive subcarriers in the frequency domain and six consecutive symbols in the time domain, for a total of 72 REs. The number of bits carried by each RE depends on the modulation scheme.

In some aspects, some REs can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI-RS), Demodulation Reference Signal (DM-RS), PSS, SSS, etc. The resource grid if FIG. 4 illustrates exemplary locations of REs used to transmit DL-RS (labeled "R").

In some aspects, some of the REs carry DM-RS for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. In some implementations, the PUCCH carries uplink control information (UCI), such as scheduling requests, a CQI, a precoding matrix indicator (PMI), a rank indicator (RI), and HARQ ACK/NACK feedback. The PUSCH carries data, and may additionally be used to carry a buffer status report (BSR), a power headroom report (PHR), and/or UCI. In some cases, the PUCCH can be periodic (P), semi-persistent (SP), aperiodic (AP), and/or any combination thereof.

In some cases, the UE may transmit sounding reference signals (SRS). In some implementations, the SRS may be transmitted in the last symbol of a subframe. In some cases, the SRS may have a comb structure, and a UE may transmit SRS on one of the combs. The SRS may be used by a base station for channel quality estimation to enable frequency-dependent scheduling on the UL. In some implementations, the SRS can be P, SP, AP, and/or any combination thereof.

In some aspects, one or more resources in the resource grid can be used to perform sidelink communications. For example, sidelink communications can be implemented using a mode (e.g., mode 1) in which a base station (e.g., base station 102 of FIG. 1) can designate/select one or more resources (e.g., resource elements (e.g., RE 404), resource blocks (e.g., RB 402), subcarriers, symbols, frames, sub-frames, etc.) for sidelink communications. In another example, sidelink communications can be implemented using a mode (e.g., mode 2) in which a UE (e.g., UE 104 of FIG. 1) can designate/select one or more resources (e.g., resource elements (e.g., RE 404), resource blocks (e.g., RB 402), subcarriers, symbols, frames, sub-frames, etc.) for sidelink communications. In some aspects, resource allocation for sidelink communications can correspond to one or more subchannels in the frequency domain and one or more slots in the time domain. In some cases, a subchannel may include from 10 RBs to 100 RBs. In some examples, a sidelink slot may include 7-14 OFDM symbols.

In some examples, a UE (e.g., UE 104 of FIG. 1) can be configured to receive a sidelink packet by performing blind decoding of all sidelink subchannels. In some aspects, the sidelink UE can decode a PSCCH in a configured sidelink resource pool. In some cases, the PSCCH can be used to carry SCI which contains information about the resource allocation on the PSSCH. For example, a first stage SCI can be transmitted in PSCCH and may include information regarding the PSSCH bandwidth as well as resource reservations in future slots. In some cases, a second stage SCI can be located and decoded after decoding PSCCH. In some aspects, a source identifier and/or a destination identifier can be used to determine a source and/or destination UE associated with a packet. In some examples, the UE can proceed with decoding PSSCH if PSCCH (e.g., SCI) indicates a receiver ID matching the UE's ID. In some configurations, PSCCH and PSSCH can be transmitted using the same slot.

In some examples, PSCCH may be configured to occupy or use multiple RBs in a single subchannel. In some aspects, a subchannel can occupy multiple PRBs (e.g., a subchannel can occupy 10, 15, 20, 25, 50, 75, 100 PRBs). In some cases, PSCCH may be configured to occupy 10, 12, 15, 20, or 25 PRBs in a subchannel. In some aspects, PSCCH may be limited to one subchannel. In some cases, the duration of PSCCH can be configured use 2 or 3 symbols. In some aspects, a resource pool (RP) can include any number of subchannels (e.g., a RP can include 1-27 subchannels). In some cases, the size of PSCCH may be fixed for a RP (e.g., size can correspond to 10% to 100% of a subchannel). In some examples, PSSCH may occupy 1 or more subchannels and may include a second stage SCI.

FIG. 5 is a diagram illustrating an example of a slot format table 500, which may be employed by the disclosed systems and techniques for CLI-based sensing, in accordance with some examples. In one or more examples, the slot format (e.g., as designated in a slot format table 500) may provide a network entity (e.g., a UE) with the required downlink and/or uplink transmission pattern. In some examples of the disclosed system, the slot format may provide the network entity an indication of an allocation of some of its resources (e.g., allocating RF sensing resources for communications purposes).

In one or more examples, a slot can be utilized as a dynamic scheduling unit (e.g., for communications and/or for RF sensing). The number of OFDM symbols per slot is typically fixed (e.g., as in NR). For example, when the cyclic prefixes (CPs) of an OFDM waveform have a normal duration, there are typically a total of fourteen OFDM symbols. In another example, when the CPs of an OFDM waveform have an extended duration, there are typically a total of twelve slots. The example slot format table 500 in FIG. 5 shows a total of fourteen OFDM symbols per slot.

In some cases, a slot may be classified as downlink, where all of the symbols of the slot are dedicated for the downlink transmissions. In some cases, a slot may be classified as uplink, where all of the symbols of the slot are dedicated for uplink transmissions. In the case of half duplex frequency division duplexing (FDD), all symbols within a slot for a downlink carrier are used for downlink transmissions, and all symbols within a slot for an uplink carrier are used for uplink transmissions.

However, in the case of TDD (e.g., as is shown in the slot format table 500 of FIG. 5), it is possible for a slot to be configured to be used for a mix of uplink and downlink transmissions. When using a mix of uplink and downlink transmissions for a slot, a guard period may be necessary for the transceiver switching from the downlink to the uplink, and to allow for a timing advance in the uplink.

NR TDD utilizes a flexible slot configuration (e.g., which is shown in the slot format table 500 of FIG. 5). For this configuration, OFDM symbols of a slot can be designated as "downlink" (e.g., represented by a "D" letter) for downlink transmissions, "uplink" (e.g., representing by a "U" letter) for uplink transmissions, or "flexible" (e.g., represented by an "F" letter). The flexible symbol "F" can be configured for either uplink or downlink transmissions. One of the intentions of introducing the flexible symbols within the slots is to handle a guard period (e.g., for transitioning between uplink and downlink or between downlink and uplink communications). It should be noted that if a slot format is not provided by the network (e.g., a network entity), all of the OFDM symbols may considered to be "flexible" as a default.

NR supports the slot format configuration in static, semi-static, or dynamic fashion. The static slot configuration and the semi-static slot configuration are executed using RRC, while the dynamic slot configuration is executed using physical downlink control channel (PDCCH) downlink control information (DCI). In TDD, for small and/or isolated cells, dynamic TDD may be more suitable to adapt to variations in traffic. For large cells, the semi-static TDD may be more suitable for handling interference issues.

Figure 6:
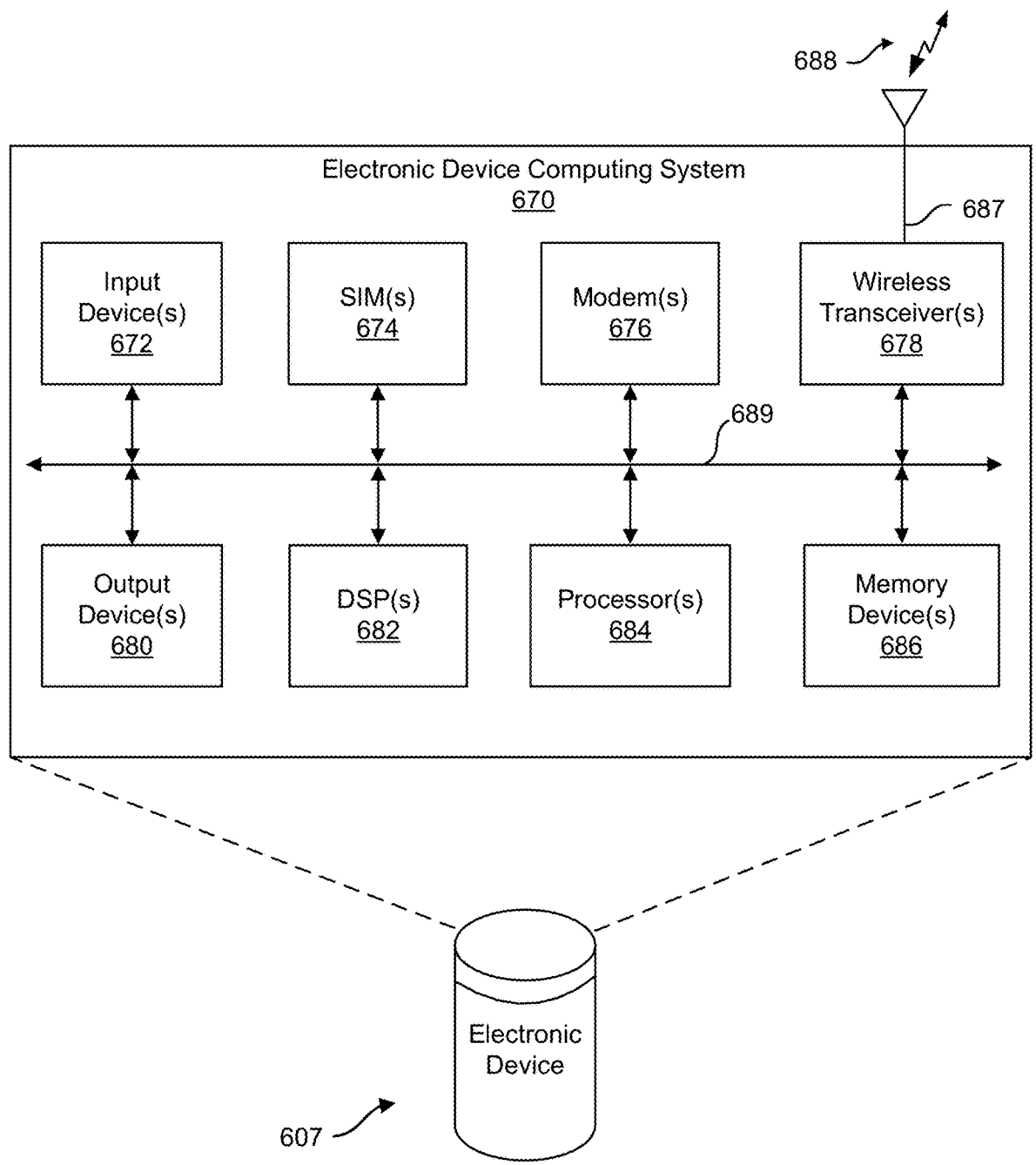
FIG. 6 is a block diagram illustrating an example of a computing system of an electronic device that may be employed by the disclosed systems and techniques for CLI cancellation, in accordance with some aspects.

FIG. 6 is a block diagram illustrating an example of a computing system 670 of an electronic device 607 that may be employed by the disclosed systems and techniques for CLI cancellation, in accordance with some examples. The electronic device 607 is an example of a device that can include hardware and software for the purpose of connecting and exchanging data with other devices and systems using a communications network (e.g., a 3GPP network, such as a 5G/NR network, a 4G/LTE network, a WiFi network, or other communications network). For example, the electronic device 607 can include, or be a part of, a mobile device (e.g., a mobile telephone), a wearable device (e.g., a network-connected or smart watch), an extended reality device (e.g., a VR device, an AR device, or a MR device), a personal computer, a laptop computer, a tablet computer, an IoT device, a wireless access point, a router, a vehicle or component of a vehicle, a server computer, a robotics device, and/or other device used by a user to communicate over a wireless communications network. In some cases, the device 607 can be referred to as UE, such as when referring to a device configured to communicate using 5G/NR, 4G/LTE, or other telecommunication standard. In some cases, the device can be referred to as a station (STA), such as when referring to a device configured to communicate using the Wi-Fi standard.

The computing system 670 includes software and hardware components that can be electrically or communicatively coupled via a bus 689 (or may otherwise be in communication, as appropriate). For example, the computing system 670 includes one or more processors 684. The one or more processors 684 can include one or more CPUs, ASICs, FPGAs, APs, GPUs, VPUs, NSPs, microcontrollers, dedicated hardware, any combination thereof, and/or other processing device/s and/or system/s. The bus 689 can be used by the one or more processors 684 to communicate between cores and/or with the one or more memory devices 686.

The computing system 670 may also include one or more memory devices 686, one or more digital signal processors (DSPs) 682, one or more subscriber identity modules (SIMs) 674, one or more modems 676, one or more wireless transceivers 678, one or more antennas 687, one or more input devices 672 (e.g., a camera, a mouse, a keyboard, a touch sensitive screen, a touch pad, a keypad, a microphone or a microphone array, and/or the like), and one or more output devices 680 (e.g., a display, a speaker, a printer, and/or the like).

The one or more wireless transceivers 678 can receive wireless signals (e.g., signal 688) via antenna 687 from one or more other devices, such as other user devices, network devices (e.g., base stations such as evolved Node Bs (eNBs) and/or gNodeBs (gNBs), WiFi access points (APs) such as routers, range extenders or the like, etc.), cloud networks, and/or the like. In some examples, the computing system 670 can include multiple antennas or an antenna array that can facilitate simultaneous transmit and receive functionality. Antenna 687 can be an omnidirectional antenna such that RF signals can be received from and transmitted in all directions. The wireless signal 688 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 678 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 688 into a baseband or intermediate frequency and can convert the RF signals to the digital domain.

In some aspects, the one or more wireless transceivers 678 can perform alternating transmit and receive functions (e.g., performing a half-duplex operation). For example, the one or more wireless transceivers 678 can alternately enable an RF transmitter to transmit an uplink Tx signal when the one or more wireless transceivers 678 are not enabled to receive (i.e., not receiving), and enable an RF receiver to receive a downlink Rx signal when the one or more wireless transceivers 678 are not enabled to transmit (i.e. not transmitting).

In other aspects, the one or more wireless transceivers 678 can perform concurrent transmit and receive functions (e.g., performing a sub-band or full-band full-duplex operation). For example, the one or more wireless transceivers 678 can enable an RF receiver to receive at or near the same time as it enables an RF transmitter to transmit.

In some cases, the computing system 670 can include a coding-decoding device (or CODEC) configured to encode and/or decode data transmitted and/or received using the one or more wireless transceivers 678. In some cases, the computing system 670 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 678.

The one or more SIMs 674 can each securely store an international mobile subscriber identity (IMSI) number and related key assigned to the user of the electronic device 607. The IMSI and key can be used to identify and authenticate the subscriber when accessing a network provided by a network service provider or operator associated with the one or more SIMs 674. The one or more modems 676 can modulate one or more signals to encode information for transmission using the one or more wireless transceivers 678. The one or more modems 676 can also demodulate signals received by the one or more wireless transceivers 678 to decode the transmitted information. In some examples, the one or more modems 676 can include a WiFi modem, a 4G (or LTE) modem, a 5G (or NR) modem, and/or other types of modems. The one or more modems 676 and the one or more wireless transceivers 678 can be used for communicating data for the one or more SIMs 674.

The computing system 670 can also include (and/or be in communication with) one or more non-transitory machine-readable storage media or storage devices (e.g., one or more memory devices 686), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 686 and executed by the one or more processor(s) 684 and/or the one or more DSPs 682. The computing system 670 can also include software elements (e.g., located within the one or more memory devices 686), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the electronic device 607 can include means for performing operations described herein. The means can include one or more of the components of the computing system 670. For example, the means for performing operations described herein may include one or more of input device(s) 672, SIM(s) 674, modems(s) 676, wireless transceiver(s) 678, output device(s) 680, DSP(s) 682, processors 684, memory device(s) 686, and/or antenna(s) 687.

As noted previously, some communication modes (e.g., time division duplexing (TDD), FD, etc.) may cause an overlap in conflicting communications, such as between transmissions and/or receptions to and from UEs. One example of interference between an uplink transmission by a first UE (an aggressor UE) and a downlink reception by a second UE (a victim UE) is referred to as CLI.

In some aspects, the electronic device 607 can include means for determining a communication failure on a downlink (DL) channel indicative of cross link interference (CLI) from transmission of a communications signal by a UE on an uplink (UL) channel; means for transmitting, based on detecting the communication failure, a request for CLI measurement resources to a network entity; means for receiving a CLI reference signal configuration from the network entity; means for receiving, at the first UE, a CLI reference signal from the UE; and means for transmitting, to the network entity, a CLI measurement report based on the reference signal. In some examples, any or all of these means can include the one or more wireless transceivers 678, the one or more modems 676, the one or more processors 684, the one or more DSPs 682, the one or more memory devices 686, any combination thereof, or other component(s) of the electronic device 607.

Figure 7:
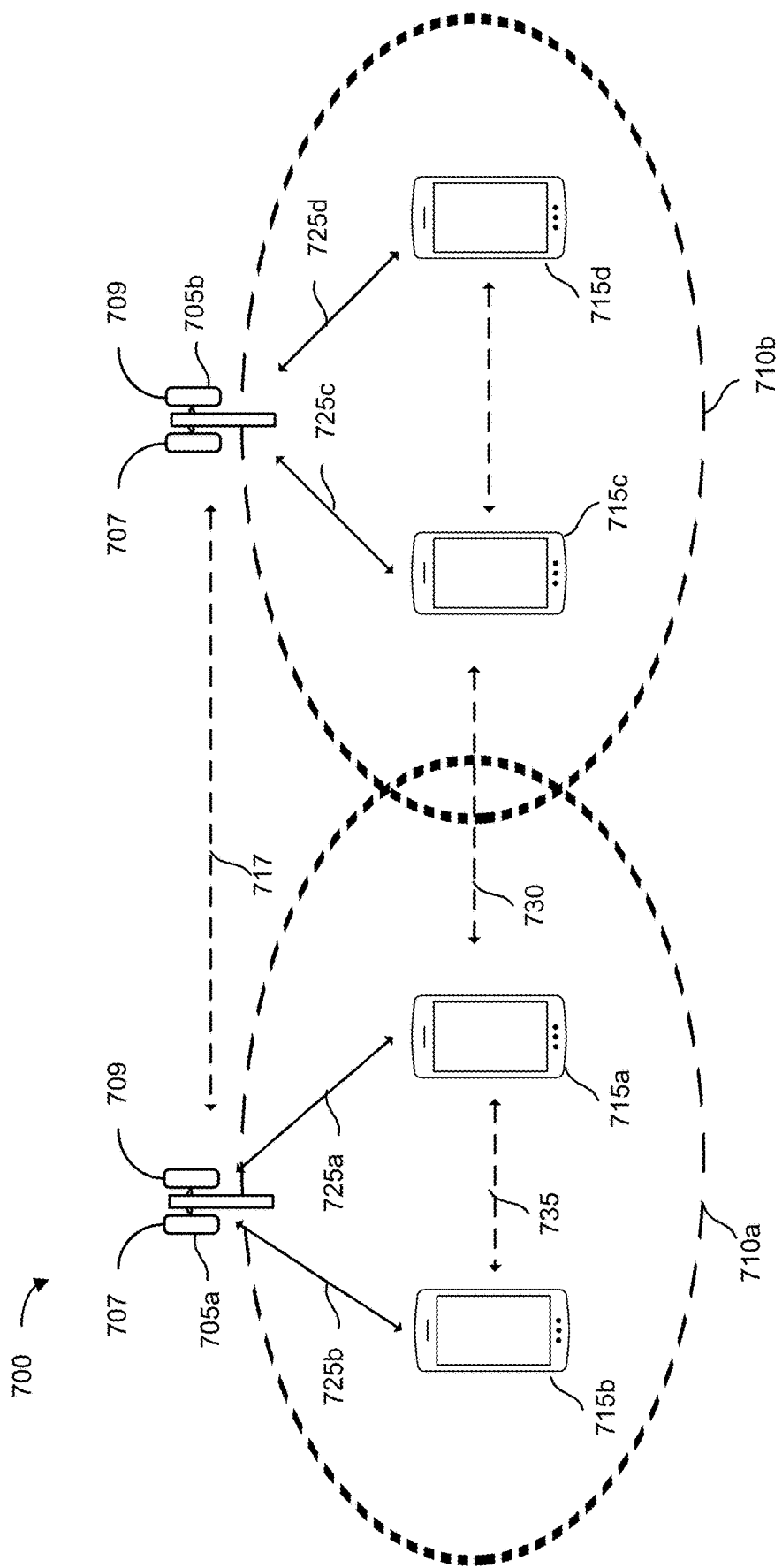
FIG. 7 is a diagram depicting an example of the occurrence of CLI in a system, in accordance with some aspects.

FIG. 7 is a diagram depicting an example of the occurrence of CLI in a system 700 that may employ the disclosed systems and techniques for CLI detection, in accordance with some examples. The system 700 of FIG. 7 may include UEs 715a, 715b, 715c, 715d (e.g., UEs 104 of FIG. 1), and base stations (e.g., gNBs) 705a, 705b. The UE 715a (also referred to herein as UE1), UE 715b (also referred to herein as UE2), and the base station 705a may be located within a first cell 710a (also referred to herein as cell 1). In some aspects, the UE 715c (also referred to herein as UE3), UE 715d (also referred to herein as UE4), and the base station 705b may be located within a second cell 710b (also referred to herein as cell 2). As illustrated, the base stations 705a, and 705b can include multiple transceivers 707, and 709 that can operate simultaneously (e.g., in a MIMO configuration).

In some cases, different transceivers 707, 709 of a single base station 705a, 705b, may experience self-interference. For example, transceiver 707 of base station 705a may be configured to transmit a UL transmission (e.g., signal 725b) to UE2 715b while transceiver 709 of base station 705b is configured to receive a DL transmission from UE1 715a (e.g., signal 725a). In some cases, the UL transmission from transceiver 707 can reflect from one or more objects and the transceiver 709 can receive the reflected signal. In some cases, the interference between transceivers of a base station can be referred to as self-interference, clutter, or the like.

In some cases, different transceivers 707, 709 of a single base station 705a, 705b, may experience self-interference. For example, transceiver 707 of base station 705a may be configured to transmit a UL transmission (e.g., signal 725b) to UE2 715b while transceiver 709 of base station 705b is configured to receive a DL transmission from UE1 715a (e.g., signal 725a). In some cases, the UL transmission from transceiver 707 can reflect from one or more objects and the transceiver 709 can receive the reflected signal. In some cases, the interference between transceivers of a base station can be referred to as self-interference, clutter, or the like.

Figure 8:
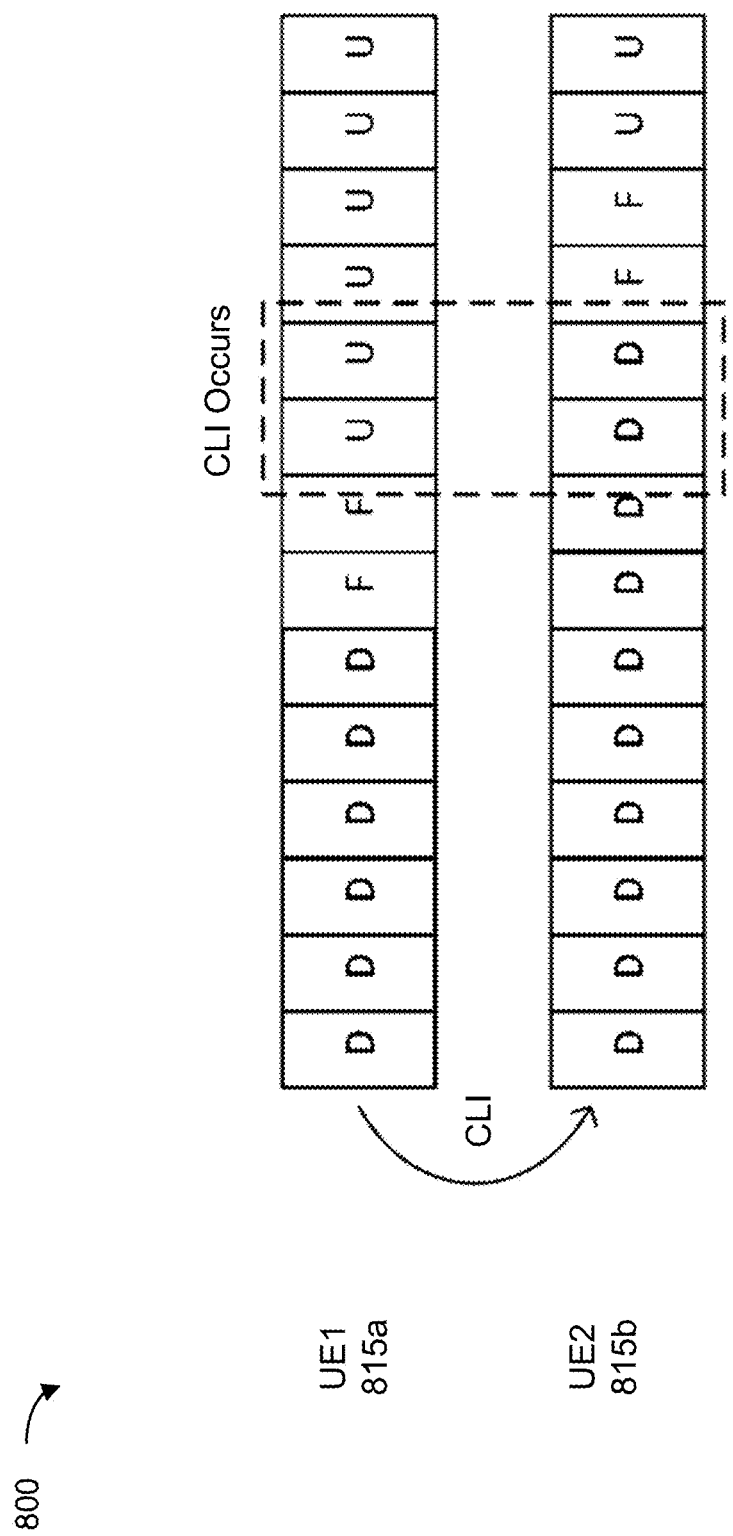
FIG. 8 is a diagram illustrating an example time division duplexing (TDD) configuration for the system of FIG. 7, in accordance with some aspects.

FIG. 8 is a diagram illustrating example TDD configurations 800 (e.g., including TDD configuration 815a and TDD configuration 815b) for the system 700 of FIG. 7, in accordance with some examples. Each of the cells 710a, 710b of FIG. 7 may have a different TDD configuration 815a, 815b. For example, the first cell 710a may have a first TDD configuration 815a, and the second cell 710b may have a second TDD configuration 815b. The network devices (e.g., UEs 715a, 715b, 715c, 715d, and base stations 705a, 705b) may communicate using their TDD configuration associated with their particular cell. For example, the UE 715a (e.g., UE1) and the base station 705a located within the first cell 710a (e.g., cell 1) may communicate using the first TDD configuration 815a. In addition, the UE 715b (e.g., UE2) and the base station 705a located within the first cell 710a may communicate using the first TDD configuration 815a. For example, UE1 may communicate with the first transceiver 707 of base station 705a and UE2 may communicate with the second transceiver 709 of base station 705a. In some cases, the UE 715c (e.g., UE3) and the base station 705b located within the second cell 710b (e.g., cell 2) may communicate using the second TDD configuration 815b. In some examples, the UE 715d (e.g., UE4) and the base station 705b located within the second cell 710b may communicate using the second TDD configuration 815b. For example, UE3 may communicate with first transceiver 707 of base station 705b and UE4 communicate with second transceiver 709 of base station 705b.

Each TDD configuration 815a, 815b may include a plurality of symbols (e.g., OFDM symbols of FIG. 4). The symbols of a slot (e.g., slot of FIG. 4) may be designated as "downlink" (e.g., represented by a "D" letter) for downlink transmissions, "uplink" (e.g., represented by a "U" letter) for uplink transmissions, "flexible" (e.g., represented by an "F" letter), and/or "sensing" (e.g., represented by an "SRS" for sounding reference signal). The flexible symbol "F" can be configured for either uplink or downlink transmissions. The flexible symbol "F" can be utilized as a guard period between the uplink transmissions and the downlink transmissions to prevent inter-symbol interference and/or to provide time for a UE to adjust its RF hardware.

Each of the base stations 705a, 705b may transmit a downlink signal (e.g., signals 725a, 725b, 725c, 725d) on a downlink symbol (e.g., "D" symbol). In some cases, each of the UEs 715a, 715b, 715c, 715d may transmit an uplink signal (e.g., signals 725a, 725b, 725c, 725d) on an uplink symbol (e.g., "U" symbol). Each of the UEs 715a, 715b, 715c, and 715d, may transmit a sensing signal (e.g., an SRS) in an uplink transmission on a sensing symbol (e.g., "SRS" symbol).

In some cases, neighboring cells with different TDD configurations may lead to conflicting (overlapping) transmissions for some symbols of a slot. The TDD configurations 800 of FIG. 8, for example, exhibit conflicting transmissions in the ninth and tenth slots of TDD configuration 815a and TDD configuration 815b. In particular, for these two specific slots (e.g., the ninth and tenth slots), a UL transmission (e.g., denoted by the letter "U") and a DL transmission (e.g., denoted by the letter "D") are configured to occur at the same frequency at the same time for these two adjacent cells 710a, 710b. For example, UE 715c in cell 710b may be configured to transmit a UL transmission (e.g., signal 725c) at the same time UE 715a in cell 710a may be configured to receive a DL transmission (e.g., signal 725a). Since these UEs 715a, and 715c are nearby each other in neighboring cells 710a, 710b, the UL transmission of UE 715c may cause an interference in the DL reception of UE 715a. This type of interference is referred to as CLI and, in particular, as inter-cell UE-to-UE CLI (e.g., which is denoted by link 730 of FIG. 7). The UE 715c transmitting the UL signal may be referred to as the "aggressor UE," and the UE 715a receiving the affected DL transmission (e.g., containing interference) may be referred to as the "victim UE." The CLI is transparent to the aggressor UE (e.g., UE 715c).

In another illustrative example, UE 715b in cell 710a may be configured to transmit a UL transmission (e.g., signal 725b) at the same time UE 715a in cell 710a may be configured to receive a DL transmission (e.g., signal 725a). In some cases, the UE transmission of UE 715b may can an interference in the DL reception of UE 715a. This type of interference is referred to as intra-cell UE-to-UE CLI (e.g., which is denoted by link 735 of FIG. 7). It should be noted that CLI in the system 700 may occur on additional links (e.g., links 717, 735) other than on link 730.

In addition, in some cases, different transceivers 707, 709 of a single base station 705a, 705b, may experience self-interference. For example, transceiver 707 of base station 705a may be configured to transmit a DL transmission (e.g., signal 725b) to UE2 715b while transceiver 709 of base station 705b is configured to receive a UL transmission from UE1 715a (e.g., signal 725a). In some cases, the DL transmission from transceiver 707 can reflect from one or more objects and the transceiver 709 can receive the reflected signal which can interfere with the UL transmission from UE1 715a. In some cases, the interference between transceivers of a base station can be referred to as self-interference, clutter, or the like.

According to some aspects of the disclosure, a network entity such as cell 710a and the cell 710b may be configured for sub-band full duplex (SBFD) operations, or the simultaneous transmission and reception of downlink and uplink on a sub-band basis. For example, as described above, the cell 710a can simultaneously transmit on a sub-band and receive on a different sub-band. SBFD operations and reduce latency because it is possible to receive a DL signal in UL time slots, which can reduce transmission delays. SBFD operations also improve UL coverage and enhance the system by improving capacity, resource utilization, and spectrum efficiency. In some aspects, SBFD enables flexible and dynamic UL/DL resource adaption according to UL/DL traffic in a robust manner.

In some aspects, CLI will only occur in some scenarios, and monitoring for inter-UE CLI on a periodic basis would be expensive. According to some aspects of the disclosure, event-based monitoring of inter-UE CLI can be performed and is described below with reference to FIGS. 9, 10, and 11. According to one aspect, downlink failures may cause the downlink UE to determine that inter-UE CLI may be affecting downlink operations and causing the downlink UE to fail to decode data. For example, an uplink UE may be transmitting uplink data within the same time slot as the downlink UE is receiving, and the inter-UE CLI caused based on simultaneous transmission and reception may be causing the downlink failures. A downlink UE may be referred to as the victim UE and the uplink UE may be referred to as the aggressor UE in this example.

Figure 9:
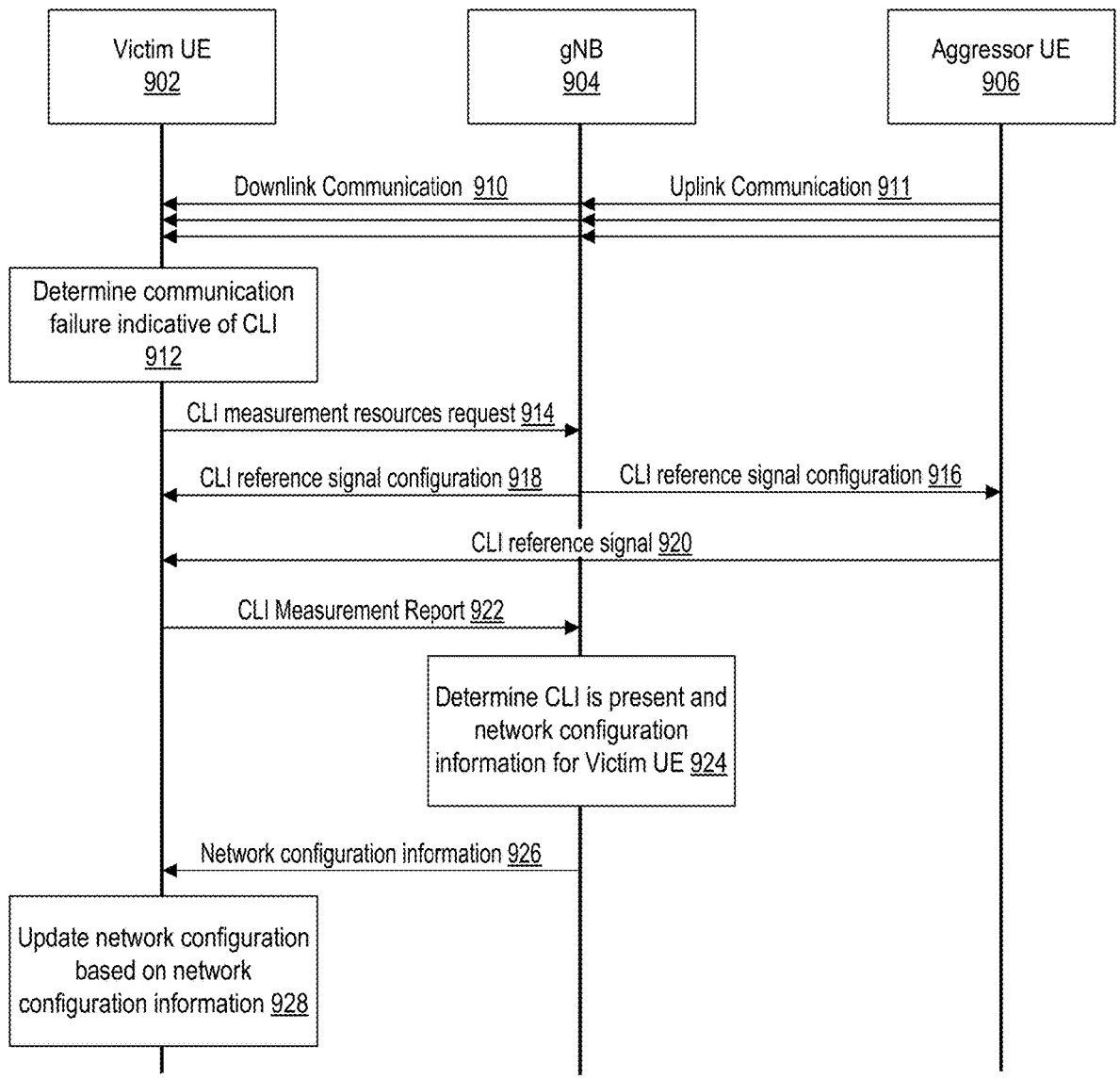
FIG. 9 illustrates a sequence diagram of an event-driven CLI measurement according to some aspects of the disclosure.

FIG. 9 illustrates a sequence diagram 900 of an event-driven CLI measurement according to some aspects of the disclosure. As illustrated in FIG. 9, a victim UE 902 is connected to a gNB 904, or other network entity (e.g., a femto base station), and is receiving a downlink communication 910 (e.g., data on a PDSCH, control information on a PDCCH, etc.). At the same time, an aggressor UE 906 is also connected to the gNB 904 and is transmitting an uplink communication 911 (e.g., data on a PUSCH, control information on a PUCCH, etc.) to the gNB 904. The downlink communication of the victim UE 902 may suffer from inter-UE CLI due to the simultaneously transmitted uplink communication 911 and may be unable to receive and decode the received downlink communication 910 due to the CLI.

At block 912, the victim UE 902 is configured to determine that the communication failure associated with the downlink communication 910 is indicative of inter-UE CLI. For example, the victim UE 902 may determine that the downlink communication 910 failed a threshold number of times, and may determine that the communication failure associated with the downlink communication 910 is indicative of inter-UE CLI based on the downlink communication 910 failing the threshold number of times. In one illustrative example, the threshold number of times may be three times. However, the threshold number may be any suitable value, and may be configurable.

Additionally or alternatively, determining that the communication failure is indicative of inter-UE CLI may be based on determining that the victim UE 902 should be able to decode the communication. For example, the UE may determine that a received power associated with at least one reference signal (e.g., an RSRP, RSSI, SNR, etc.) from the gNB 904 (or other network entity) is greater than a minimum power threshold. The minimum power threshold indicates that the reception of the reference signal has sufficient power and indicates that interference may be the cause reception failure of the downlink communication 910. In some examples, the minimum power threshold may be associated with a beam management procedure. In one illustrative example, the victim UE 902 may determine that the downlink communication 910 failed the threshold number of times and that power (e.g., an RSRP, RSSI, SNR, etc.) associated with the at least one reference signal is greater than the minimum power threshold. The victim UE 902 may then determine that the communication failure associated with the downlink communication 910 is indicative of inter-UE CLI based on the downlink communication 910 failing the threshold number of times and the power associated with the at least one reference signal being greater than the minimum power threshold.

In response to determining that the downlink reception failure is indicative of CLI, the victim UE 902 transmits a CLI measurement resources request 914 to the gNB 904. In response to the CLI measurement resources request 914, the gNB 904 is configured to transmit a CLI reference signal configuration 916 to the victim UE 902 and a CLI reference signal configuration 918 to the aggressor UE 906. In this example, the gNB 904 has previously configured the victim UE 902 and the aggressor UE 906 to transmit and receive at the same time, and determines that the aggressor UE 906 may be causing the inter-UE CLI.

The gNB sends a CLI reference signal configuration 916 to the aggressor UE 906 and a CLI reference signal configuration 918 to the victim UE 902. The CLI reference signal configuration 916 includes information to configure the aggressor UE 906 to transmit a CLI reference signal 920, and the CLI reference signal configuration 918 includes information to configure the victim UE 902 to receive the CLI reference signal 920. For example, the CLI reference signal configuration 916 can include identification of a type of reference signal for the aggressor UE 906 to directly transmit to the victim UE 902, a transmission power, and so forth. Non-limiting examples of the CLI reference signal 920 include a CSI-RS or a demodulation reference signal (DMRS). The CLI reference signal configuration 916 can include parameters associated with the CLI reference signal 920, such as a timing window to transmit the information, an RB, etc.

The victim UE 902 uses the CLI reference signal configuration 918 to configure for inter-UE reception for the CLI reference signal 920. For example, the CLI reference signal configuration 918 may indicate various parameters that correspond to parameters of the CLI reference signal configuration 916. In response to the CLI reference signal configuration 918, the victim UE 902 configures and receives the CLI reference signal 920. In some cases, the CLI reference signal configuration 916 may be identical to the CLI reference signal configuration 918 with the exception of addressing information. In other cases, the CLI reference signal configuration 916 and the CLI reference signal configuration 918 can be different messages, such as the CLI reference signal configuration 916 indicates transmission of the CLI reference signal and the CLI reference signal configuration 918 indicates reception of the CLI reference signal.

In some aspects, when the victim UE 902 receives the CLI reference signal 920, the victim UE 902 is configured to measure at least one parameter, such as the received power (e.g., RSRP) of the CLI reference signal 920. The CLI reference signal configuration 918 may also indicate the parameters for the victim UE 902 to measure. In response to measuring the CLI reference signal 920, the victim UE 902 generates and transmits a CLI measurement report 922 to the gNB 904 based on the CLI reference signal configuration 918.

The gNB 904 receives the CLI measurement report 922 and is configured to determine whether inter-UE CLI is present between the victim UE 902 and the gNB 904 at block 924. In one illustrative aspect, the CLI measurement report 922 may include a path loss between the victim UE 902 and the aggressor UE 906, or the gNB 904 may determine the path loss between the victim UE 902 and the aggressor UE 906 from information included in the CLI measurement report 922. The path loss may indicate that the victim UE 902 and the gNB 904 are separated by a distance that creates a significant amount of inter-UE CLI because the victim UE 902 receives information from the gNB 904 at the same time the aggressor UE 906 transmits to the gNB 904.

In response to determining that inter-UE CLI is present between the victim UE 902 and the aggressor UE 906, the gNB 904 is further configured to determine network configuration information for the victim UE at block 924. For example, the gNB 904 may identify a remediation action for the victim UE 902 to perform to reduce inter-UE CLI of the victim UE 902. In one aspect, the gNB 904 may unpair the victim UE 902 and the aggressor UE 906 for SBFD operation and pair the victim UE 902 with another UE (not shown) so that the victim UE 902 and the aggressor UE 906 do not communicate with the gNB 904 at the same time. An example of the unpairing is illustrated in FIG. 10B. In another aspect, the victim UE 902 may be configured to transmit in a different sub-band to increase the frequency difference between the victim UE 902 and the aggressor UE 906. An example of the changing sub-band is illustrated in FIG. 10C. Further aspects of the remediation action may also include increasing a guard band between the UL sub-band and the DL sub-band. An example of the changing sub-band is illustrated in FIG. 10D.

After the gNB 904 identifies the remediation action, the gNB 904 determines network configuration information for the victim UE 902 and sends the network configuration information 926 to the victim UE. In response to the victim UE 902 receiving the network configuration information, at block 928, the victim UE 902 reconfigures the network connection to communicate based on the remediation action identified by the gNB 904.

Although FIG. 9 illustrates that inter-UE CLI may occur on the same network entity (e.g., gNB 904), the inter-UE CLI may occur between UEs that are connected to different network entities, as described above with reference to FIGS. 7 and 8. In one aspect, the gNB 904 may be configured to determine whether another UE in a different network entity is causing the CLI at the UE. In this illustrative aspect, the gNB 904 may transmit a request to neighboring network entities to identify UEs that are connected and configured to transmit on a timeslot that at least partially overlaps with the victim UE. The gNB 904 may receive a report from neighboring base stations that identify candidate aggressor UEs and the gNB 904 could further request the neighboring network entities to instruct any candidate aggressor UEs to transmit a CLI reference signal (e.g., CSI-RS, DMRS, etc.) to the victim UE.

FIG. 10A illustrates the allocation of resources in the SBFD operation of an aggressor UE and a victim UE according to various aspects of the disclosure. In FIG. 10A, a victim UE is receiving downlink in a sub-band 1010 and an aggressor UE is transmitting in a sub-band 1020. In some aspects, the victim UE or another UE may also be transmitting in sub-band 1030. Sub-band 1010 is separated from the sub-band 1020 by guard band 1050, and sub-band 1020 is separated from sub-band 1030 by guard band 1052. In this illustration, the aggressor UE may create inter-UE CLI based on SBFD transmission and reception and cause the victim UE to be unable to receive the downlink communication transmitted in this timeslot.

FIGS. 10B, 10C, and 10D illustrate allocation of resources in SBFD operation after performing mitigation according to various aspects of the disclosure. For example, FIG. 10B illustrates that the network entity (e.g., the gNB) may determine to pair the victim UE with another UE in a different time slot and moves the DL sub-band 1010 of the victim UE into a different timeslot. FIG. 10C illustrates that the network entity determines to move the DL sub-band 1010 to have a higher frequency, which reduces the inter-UE CLE based on the frequency difference. FIG. 10D further illustrates that the guard band 1050 is increased, for example, by increasing the number of RBs of the guard band 1050 between the DL sub-band 1010 and the UL sub-band 1020.

Figure 11:
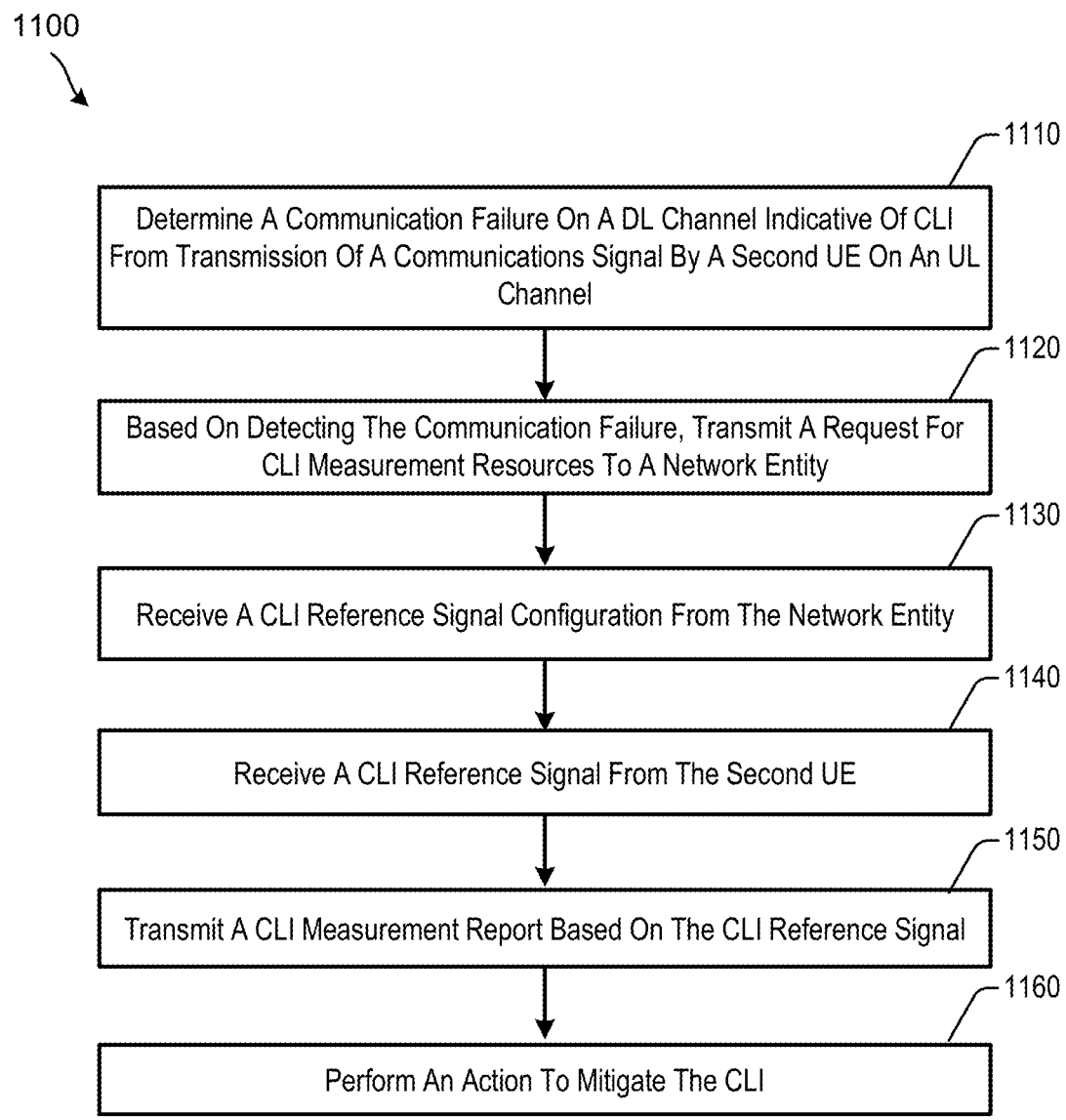
FIG. 11 is a flow chart illustrating an example of a process for identifying and mitigating CLI in wireless communications at a UE, in accordance with some examples.

FIG. 11 is a flow chart illustrating an example of a method 1100 for identifying and mitigating CLI in wireless communications. The method 1100 can be performed by a UE (e.g., a victim UE, such as the victim UE 902) or by a component or system (e.g., a chipset) of the UE. The UE may include a mobile device such as a mobile phone, a network-connected watch, an extended reality (XR) device such as a virtual reality (VR) device or augmented reality (AR) device, a vehicle or computing device or system of the vehicle, or other device). The operations of the method 1100 may be implemented as software components that are executed and run on one or more processors (e.g., receive processor 258 of FIG. 2, transmit processor 264 of FIG. 2, controller/processor 280 of FIG. 2, processor(s) 684 of FIG. 6, processor 1310 of FIG. 13, and/or other processor(s)). Further, the transmission and reception of signals by the wireless communications device in the method 1100 may be enabled, for example, by one or more antennas, one or more transceivers, and/or other components for receiving and/or transmitting communications (e.g., modulator/demodulator 254a of FIG. 2, MIMO detector 256 of FIG. 2, Tx MIMO processor 266 of FIG. 2, receive processor 258 of FIG. 2, transmit processor 264 of FIG. 2, wireless transceiver(s) 678 of FIG. 6, modem(s) 676 of FIG. 6, communication interface 1340 of FIG. 13, and/or other transceiver or transceiver component).

At block 1110, the UE (or component thereof) may determine a communication failure on a DL channel indicative of CLI from transmission of a communications signal by a second UE on an UL channel. In one example, determining of the communication failure includes identifying a number of communication failures on the DL channel is greater than a threshold number of communication failures. The determining of the communication failure also includes determining a quality of the DL channel exceeds a minimum threshold. In some aspects, the minimum threshold indicates that the signal quality of the downlink is sufficient. For example, the CSI-RS or the DMRS of a base station may be above a minimum power level. In some aspects, the minimum power threshold may be associated with a beam management procedure.

In some aspects, the DL channel may be one of a physical downlink shared channel (PDSCH), a PDCCH, a broadcast control channel (BCCH), a paging control channel (PCCH), a paging channel (PCH), a physical broadcast channel (PBCH), a dedicated control channel (DCCH), a dedicated traffic channel (DTCH), a common control channel (CCCH), or other channel.

At block 1120, the UE (or component thereof) may, based on detecting the communication failure, transmit a request for CLI measurement resources to a network entity at block 1110. According to one aspect, the victim UE 902 can transmit a message to a network entity, such as a gNB, to include an inter-UE CLI measurement.

At block 1130, the UE (or component thereof) may receive a CLI reference signal configuration from the network entity. The CLI reference signal may be transmitted from a network entity and configure the victim UE 902 to receive a CLI reference signal from another UE that may be interfering (e.g., an inter-UE CLI) as noted above.

At block 1140, the UE (or component thereof) may receive a CLI reference signal from the second UE. Illustrative examples of the CLI reference include at least one of a SRS and an uplink DMRS. The CLI reference signal can include other reference signals. According to some aspects, the victim UE 902 may measure at least one parameter of the CLI, such as a reception power level. The victim UE 902 may be configured to determine a path loss, which may indicate the proximity of the aggressor UE to the victim UE 902.

At block 1150, the UE (or component thereof) may transmit a CLI measurement report to the network entity (e.g., gNB 904) based on the CLI reference signal.

At block 1160, the UE (or component thereof) may perform an action to mitigate CLI. In one illustrative aspect of block 1160, the UE (or component thereof) may receive network configuration information including an indication of a third UE for pairing with the first UE for duplex communications. In such an illustrative example, the victim UE is switched to a different timeslot to communicate with to prevent interference with the aggressor UE. In another illustrative aspect of block 1160, the UE (or component thereof) may receive network configuration information including an indication of at least one guard band between a DL sub-band associated with the DL channel of the first UE and an UL sub-band associated with the UL channel transmitted by the second UE. In another illustrative aspect of block 1160, the UE (or component thereof) may receive network configuration information including an indication of a different frequency sub-band with lower CLI for receiving one or more communication signals on the DL channel.

In some aspects, the DL channel may include a PDSCH, a PDCCH, a BCCH, a PCCH, a PCH, a PBCH, a DCCH, a DTCH, a CCCH, or other channel.

In some illustrative aspects, the UE (or component thereof) may be configured to change network settings to avoid the aggressor UE 906 by changing a timeslot, increasing a frequency difference, increasing a guard band (e.g., a frequency range of the guard band), any combination thereof, and/or perform other CLI mitigation techniques. Other implementations to reduce CLI are possible in light of this disclosure.

Figure 12:
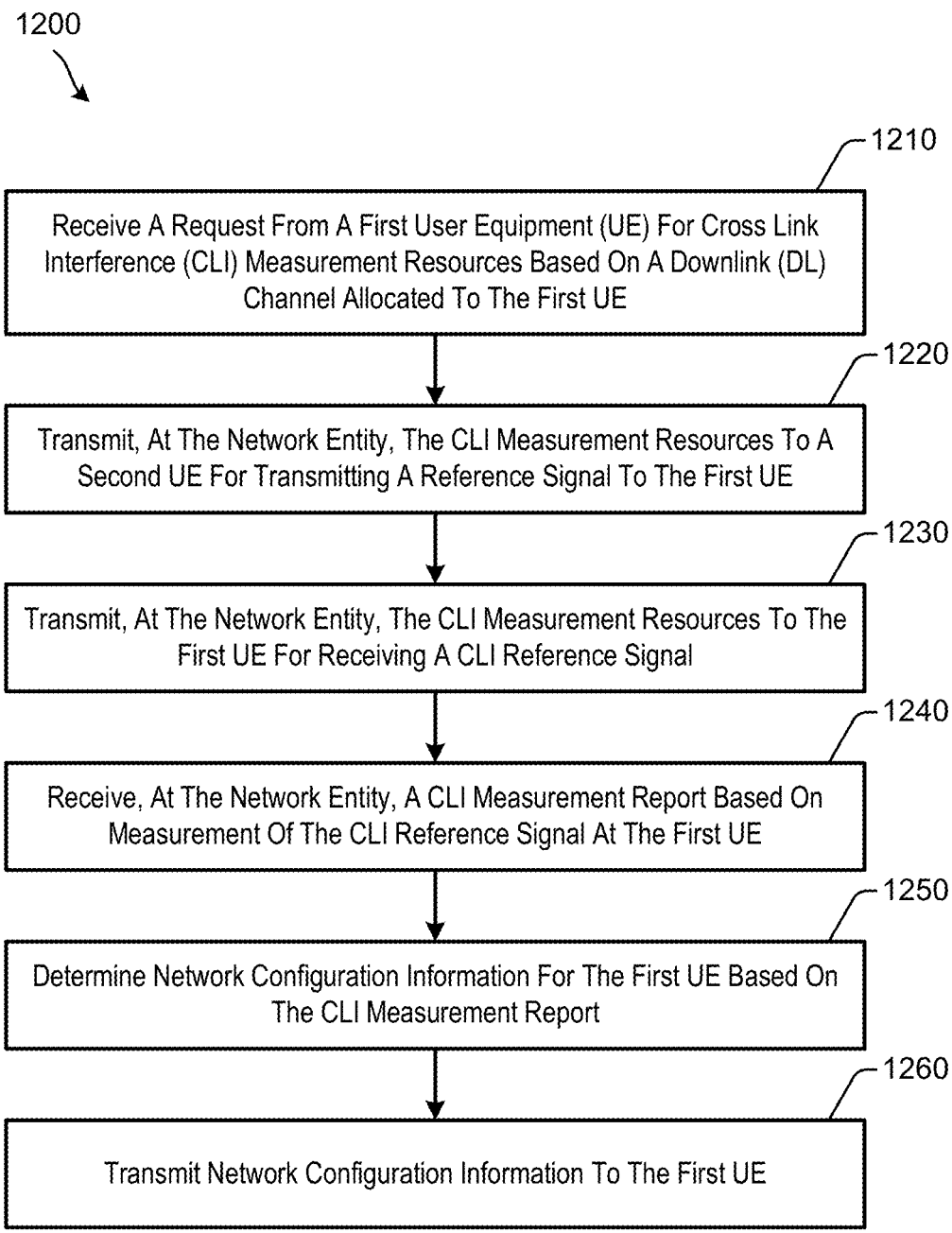
FIG. 12 is a flow chart illustrating an example of a process for identifying and mitigating CLI in wireless communication at a network entity, in accordance with some aspects of the disclosure.

FIG. 12 is a flow chart illustrating an example of a process for identifying and mitigating CLI in wireless communication at a network entity in accordance with some aspects of the disclosure. The method 1200 can be performed by a network entity, such as a base station (e.g., an eNB, gNB, or other base station, such as the gNB 904) or a portion of the base station (e.g., a CU, DU, RU, or other portion of the base station). The operations of the method 1200 may be implemented as software components that are executed and run on one or more processors (e.g., transmit processor 220 of FIG. 2, receive processor 238 of FIG. 2, controller/processor 240 of FIG. 2, processor 1310 of FIG. 13, and/or other processor(s)). Further, the transmission and reception of signals by the wireless communications device in the method 1200 may be enabled, for example, by one or more antennas, one or more transceivers, and/or other components for receiving and/or transmitting communications (e.g., modulator/demodulator 232a of FIG. 2, MIMO detector 236 of FIG. 2, Tx MIMO processor 230 of FIG. 2, receive processor 238 of FIG. 2, transmit processor 220 of FIG. 2, communication interface 1340 of FIG. 13, and/or other transceiver or transceiver component).

According to some examples, at block 1210, the network entity (or component thereof) may receive a request from a first UE for CLI measurement resources based on a DL channel allocated to the first UE. In some aspects, the minimum power threshold is associated with a beam management procedure. The quality of the DL channel that exceeds the minimum threshold is based on a received power associated with at least one reference signal transmitted from the network entity to the first UE being greater than a minimum power threshold. In one example, a number of communication failures on the DL channel may be greater than a threshold number of communication failures (e.g., three). Further, an illustrative example of block 1210 includes determining whether a quality of the DL channel exceeds a minimum threshold, which indicates that the UE should be able to decode the communication. The request may be based on a communication failure on the DL channel indicative of CLI from transmission of a communications signal by the second UE on an UL channel.

At block 1220, the network entity (or component thereof) may transmit the CLI measurement resources to a second UE for transmitting a reference signal to the first UE.

According to some examples, the network entity (or component thereof) may transmit the CLI measurement resources to the first UE for receiving a CLI reference signal at block 1230. Non-limiting examples of the reference signal include at least one of a SRS and an uplink DMRS. Other reference signals may be used.

According to some examples, the network entity (or component thereof) may receive a CLI measurement report based on measurement of the CLI reference signal at the first UE at block 1240.

According to some examples, the network entity (or component thereof) may determine network configuration information for the first UE based on the CLI measurement report at block 1250. The network configuration information includes an indication of a third UE for pairing with the first UE for duplex communications. The network configuration information includes an indication of at least one guard band between a DL sub-band associated with the DL channel of the first UE and an UL sub-band associated with the UL channel transmitted by the second UE. The network configuration information includes an indication of a different frequency sub-band with lower CLI for receiving one or more communication signals on the DL channel.

At block 1260, the network entity (or component thereof) may transmit network configuration information to the first UE to cause the first UE to take actions to remediate the CLI. For example, the network configuration information can include information that causes the UE to perform various changes, such as change the UE pairing, change the guard band, etc.

Figure 13:
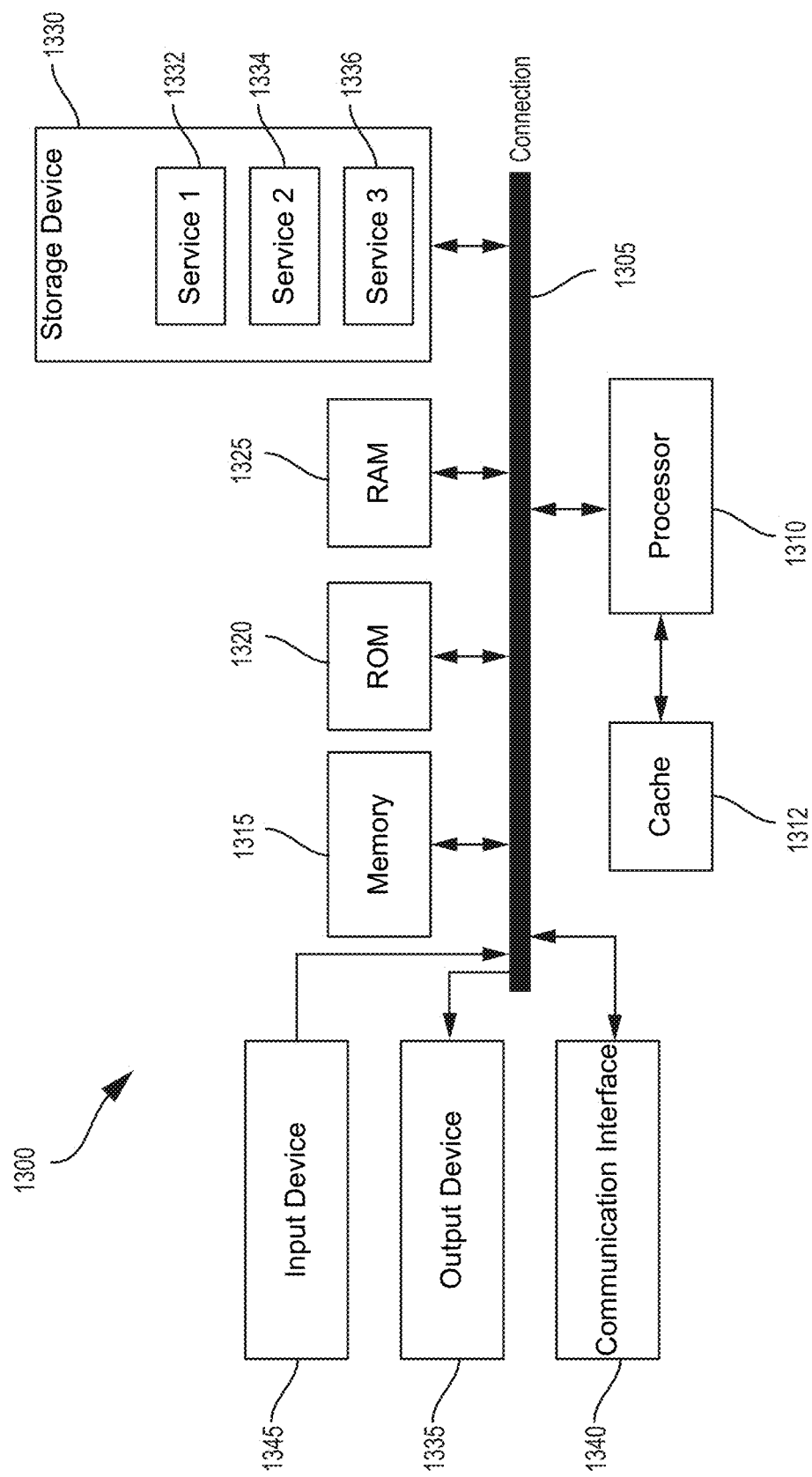
FIG. 13 is a block diagram illustrating an example of a computing system that may be employed by the disclosed system for CLI cancellation, in accordance with some aspects.

FIG. 13 is a block diagram illustrating an example of a computing system 1300 that may be employed by the disclosed system for a phase continuity configuration in CLI-based sensing, in accordance with some examples. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Although the example methods 1100 and 1200 each respectively depict a particular sequence of operations, the sequence may be altered without departing from the scope of the present disclosure. For example, some of the operations depicted may be performed in parallel or in a different sequence that does not materially affect the function of the method 1100 and/or the method 1200. In other examples, different components of an example device or system that implements the method 1100 and/or the method 1200 may perform functions at substantially the same time or in a specific sequence.

Example system 1300 includes at least one processing unit (CPU or processor) 1310 and connection 1305 that communicatively couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300.

Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1340 may also include one or more range sensors (e.g., LIDAR sensors, laser range finders, RF radars, ultrasonic sensors, and infrared (IR) sensors) configured to collect data and provide measurements to processor 1310, whereby processor 1310 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative Aspects of the Disclosure Include:

Aspect 1. A method of a wireless communication at a first user equipment (UE), comprising: determining a communication failure on a DL channel indicative of CLI from transmission of a communications signal by a second UE on an UL channel; based on detecting the communication failure, transmitting a request for CLI measurement resources to a network entity; receiving a CLI reference signal configuration from the network entity; receiving a CLI reference signal from the second UE; and transmitting a CLI measurement report to the network entity based on the CLI reference signal.

Aspect 2. The method of Aspect 1, further comprising receiving network configuration information including an indication of a third UE for pairing with the first UE for duplex communications.

Aspect 3. The method of any of Aspects 1 to 2, further comprising receiving network configuration information including an indication of at least one guard band between a DL sub-band associated with the DL channel of the first UE and an UL sub-band associated with the UL channel transmitted by the second UE.

Aspect 4. The method of any of Aspects 1 to 3, further comprising receiving network configuration information including an indication of a different frequency sub-band with lower CLI for receiving one or more communication signals on the DL channel.

Aspect 5. The method of any of Aspects 1 to 4, wherein the communication failure is determined to be indicative of the CLI based on at least one of: determining that a number of communication failures on the DL channel is greater than a threshold number of communication failures; or determining a quality of the DL channel exceeds a minimum threshold.

Aspect 6. The method of any of Aspects 1 to 5, wherein determining the quality of the DL channel exceeds the minimum threshold: determining a received power associated with at least one reference signal from the network entity is greater than a minimum power threshold.

Aspect 7. The method of any of Aspects 1 to 6, wherein the minimum power threshold is associated with a beam management procedure.

Aspect 8. The method of any of Aspects 1 to 7, wherein the DL channel comprises one of a PDSCH, a PDCCH, a BCCH, a PCCH, a PCH, a PBCH, a DCCH, a DTCH, or a CCCH.

Aspect 9. The method of any of Aspects 1 to 8, wherein the CLI reference signal comprises at least one of a sounding reference signal (SRS) and an uplink demodulation reference signal (DMRS).

Aspect 10. A method of a wireless communication at a network entity, comprising: receiving a request from a first UE for CLI measurement resources based on a DL channel allocated to the first UE; transmitting the CLI measurement resources to a second UE for transmitting a reference signal to the first UE; transmitting the CLI measurement resources to the first UE for receiving a CLI reference signal; receiving a CLI measurement report based on measurement of the CLI reference signal at the first UE; and determining network configuration information for the first UE based on the CLI measurement report.

Aspect 11. The method of Aspect 10, wherein the request is based on a communication failure on the DL channel indicative of CLI from transmission of a communications signal by the second UE on an UL channel.

Aspect 12. The method of any of Aspects 10 to 11, wherein the communication failure is based on at least one of: a number of communication failures on the DL channel being greater than a threshold number of communication failures; or a quality of the DL channel exceeding a minimum threshold.

Aspect 13. The method of any of Aspects 10 to 12, wherein the quality of the DL channel exceeding the minimum threshold is based on a received power associated with at least one reference signal transmitted from the network entity to the first UE being greater than a minimum power threshold.

Aspect 14. The method of any of Aspects 10 to 13, wherein the minimum power threshold is associated with a beam management procedure.

Aspect 15. The method of any of Aspects 10 to 14, wherein the network configuration information includes an indication of a third UE for pairing with the first UE for duplex communications.

Aspect 16. The method of any of Aspects 10 to 15, wherein the network configuration information includes an indication of at least one guard band between a DL sub-band associated with the DL channel of the first UE and an UL sub-band associated with the UL channel transmitted by the second UE.

Aspect 17. The method of any of Aspects 10 to 16, wherein the network configuration information includes an indication of a different frequency sub-band with lower CLI for receiving one or more communication signals on the DL channel.

Aspect 18. The method of any of Aspects 10 to 17, wherein the DL channel comprises one of a PDSCH, a PDCCH, a BCCH, a PCCH, a PCH, a PBCH, a DCCH, a DTCH, or a CCCH.

Aspect 19. The method of any of Aspects 10 to 18, wherein the reference signal comprises at least one of a SRS and an uplink DMRS.

Aspect 20: An apparatus of a first user equipment (UE) for wireless communication, comprising: at least one memory; and at least one processor coupled to the at least one memory and configured to: determine a communication failure on a downlink (DL) channel indicative of cross link interference (CLI) from transmission of a communications signal by a second UE on an uplink (UL) channel; based on detecting the communication failure, transmit a request for CLI measurement resources to a network entity; receive a CLI reference signal configuration from the network entity; receive a CLI reference signal from the second UE; and output, for transmission to the network entity, a CLI measurement report based on the CLI reference signal.

Aspect 21: The apparatus of Aspect 20, wherein the at least one processor is configured to receive network configuration information including an indication of a third UE for pairing with the first UE for duplex communications.

Aspect 22: The apparatus of any of Aspects 20 or 21, wherein the at least one processor is configured to receive network configuration information including an indication of at least one guard band between a DL sub-band associated with the DL channel of the first UE and an UL sub-band associated with the UL channel transmitted by the second UE.

Aspect 23: The apparatus of any of Aspects 20 to 22, wherein the at least one processor is configured to receive network configuration information including an indication of a different frequency sub-band with lower CLI for receiving one or more communication signals on the DL channel.

Aspect 24: The apparatus of any of Aspects 20 to 23, wherein, to determine the communication failure is indicative of the CLI, the at least one processor is configured to at least one of: determine that a number of communication failures on the DL channel is greater than a threshold number of communication failures; or determine a quality of the DL channel exceeds a minimum threshold.

Aspect 25: The apparatus of Aspect 24, wherein, to determine the quality of the DL channel exceeds the minimum threshold, the at least one processor is configured to: determine a received power associated with at least one reference signal from the network entity is greater than a minimum power threshold.

Aspect 26: The apparatus of any of Aspects 24 or 25, wherein the minimum power threshold is associated with a beam management procedure.

Aspect 27: The apparatus of any of Aspects 20 to 26, wherein the DL channel comprises one of a physical downlink shared channel (PDSCH), a physical downlink control channel (PDCCH), a broadcast control channel (BCCH), a paging control channel (PCCH), a paging channel (PCH), a physical broadcast channel (PBCH), a dedicated control channel (DCCH), a dedicated traffic channel (DTCH), or a common control channel (CCCH).

Aspect 28: The apparatus of any of Aspects 20 to 27, wherein the CLI reference signal comprises at least one of a sounding reference signal (SRS) and an uplink demodulation reference signal (DMRS).

Aspect 29: The apparatus of any of Aspects 20 to 28, wherein the apparatus is implemented as the first UE, and further comprising: at least one transceiver configured to: receive the CLI reference signal configuration; receive the CLI reference signal; and transmit the CLI measurement report.

Aspect 30: An apparatus of a network entity for wireless communication, comprising: at least one memory; and at least one processor coupled to the at least one memory and configured to: receive a request from a first user equipment (UE) for cross link interference (CLI) measurement resources based on a downlink (DL) channel allocated to the first UE; output the CLI measurement resources for transmission to a second UE for transmitting a reference signal to the first UE; output the CLI measurement resources for transmission to the first UE for receiving a CLI reference signal; receive a CLI measurement report based on measurement of the CLI reference signal at the first UE; and determine network configuration information for the first UE based on the CLI measurement report.

Aspect 31: The apparatus of Aspect 30, wherein the request is based on a communication failure on the DL channel indicative of CLI from transmission of a communications signal by the second UE on an uplink (UL) channel.

Aspect 32: The apparatus of Aspect 31, wherein the communication failure is based on at least one of: a number of communication failures on the DL channel being greater than a threshold number of communication failures; or a quality of the DL channel exceeding a minimum threshold.

Aspect 33: The apparatus of Aspect 32, wherein the quality of the DL channel exceeding the minimum threshold is based on a received power associated with at least one reference signal transmitted from the network entity to the first UE being greater than a minimum power threshold.

Aspect 34: The apparatus of Aspect 33, wherein the minimum power threshold is associated with a beam management procedure.

Aspect 35: The apparatus of any of Aspects 30 to 34, wherein the network configuration information includes an indication of a third UE for pairing with the first UE for duplex communications.

Aspect 36: The apparatus of any of Aspects 30 to 35, wherein the network configuration information includes an indication of at least one guard band between a DL sub-band associated with the DL channel of the first UE and an UL sub-band associated with the UL channel transmitted by the second UE.

Aspect 37: The apparatus of any of Aspects 30 to 36, wherein the network configuration information includes an indication of a different frequency sub-band with lower CLI for receiving one or more communication signals on the DL channel.

Aspect 38: The apparatus of any of Aspects 30 to 37, wherein the DL channel comprises one of a physical downlink shared channel (PDSCH), a physical downlink control channel (PDCCH), a broadcast control channel (BCCH), a paging control channel (PCCH), a paging channel (PCH), a physical broadcast channel (PBCH), a dedicated control channel (DCCH), a dedicated traffic channel (DTCH), or a common control channel (CCCH).

Aspect 39: The apparatus of any of Aspects 30 to 38, wherein the reference signal comprises at least one of a sounding reference signal (SRS) and an uplink demodulation reference signal (DMRS).

Aspect 40: The apparatus of any of Aspects 30 to 39, wherein the apparatus is implemented as the network entity, and further comprising: at least one transceiver configured to: receive the request; transmit the CLI measurement resources; transmit the CLI measurement resources; and receive the CLI measurement report.

Aspect 41: A non-transitory computer-readable medium comprising instructions which, when executed by one or more processors, cause the one or more processors to perform operations according to any of Aspects 1 to 9.

Aspect 42: An apparatus comprising means for performing operations according to any of Aspects 1 to 9.

Aspect 43: A non-transitory computer-readable medium comprising instructions which, when executed by one or more processors, cause the one or more processors to perform operations according to any of Aspects 10 to 19.

Aspect 44: An apparatus comprising means for performing operations according to any of Aspects 10 to 19.

What is claimed is:

1. An apparatus of a first user equipment (UE) for wireless communication, comprising:
   at least one memory; and
   at least one processor coupled to the at least one memory and configured to:
   determine a communication failure on a downlink (DL) channel from transmission of a communications signal by a second UE on an uplink (UL) channel;
   determine that the communication failure is indicative of cross link interference (CLI) based on a quality of the DL channel exceeding a minimum threshold, or a number of communication failures on the DL channel exceeding a threshold number of communication failures;
   based on detecting the communication failure being indicative of CLI, transmit a request for CLI measurement resources to a network entity;
   receive a CLI reference signal configuration from the network entity;
   receive a CLI reference signal from the second UE; and
   output, for transmission to the network entity, a CLI measurement report based on the CLI reference signal.

2. The apparatus of claim 1, wherein the at least one processor is configured to receive network configuration information including an indication of a third UE for pairing with the first UE for duplex communications.

3. The apparatus of claim 1, wherein the at least one processor is configured to receive network configuration information including an indication of at least one guard band between a DL sub-band associated with the DL channel of the first UE and an UL sub-band associated with the UL channel transmitted by the second UE.

4. The apparatus of claim 1, wherein the at least one processor is configured to receive network configuration information including an indication of a different frequency sub-band with lower CLI for receiving one or more communication signals on the DL channel.

5. The apparatus of claim 1, wherein, to determine the quality of the DL channel exceeds the minimum threshold, the at least one processor is configured to:
   determine a received power associated with at least one reference signal from the network entity is greater than a minimum power threshold.

6. The apparatus of claim 5, wherein the minimum power threshold is associated with a beam management procedure.

7. The apparatus of claim 1, wherein the DL channel comprises one of a physical downlink shared channel (PDSCH), a physical downlink control channel (PDCCH), a broadcast control channel (BCCH), a paging control channel (PCCH), a paging channel (PCH), a physical broadcast channel (PBCH), a dedicated control channel (DCCH), a dedicated traffic channel (DTCH), or a common control channel (CCCH).

8. The apparatus of claim 1, wherein the CLI reference signal comprises at least one of a sounding reference signal (SRS) and an uplink demodulation reference signal (DMRS).

9. The apparatus of claim 1, wherein the apparatus is implemented as the first UE, and further comprising:
   at least one transceiver configured to:
   receive the CLI reference signal configuration;
   receive the CLI reference signal; and
   transmit the CLI measurement report.

10. A method of a wireless communication at a first user equipment (UE), comprising:
    determining, at the first UE, a communication failure on a downlink (DL) channel from transmission of a communications signal by a second UE on an uplink (UL) channel;
    determining that the communication failure is indicative of cross link interference (CLI) based on a quality of the DL channel exceeding a minimum threshold, or a number of communication failures on the DL channel exceeding a threshold number of communication failures;
    based on detecting the communication failure being indicative of CLI, transmitting a request for CLI measurement resources to a network entity;
    receiving, at the first UE, a CLI reference signal configuration from the network entity;
    receiving, at the first UE, a CLI reference signal from the second UE; and
    transmitting, to the network entity, a CLI measurement report based on the CLI reference signal.

11. The method of claim 10, further comprising receiving network configuration information including an indication of a third UE for pairing with the first UE for duplex communications.

12. The method of claim 10, further comprising receiving network configuration information including an indication of at least one guard band between a DL sub-band associated with the DL channel of the first UE and an UL sub-band associated with the UL channel transmitted by the second UE.

13. The method of claim 10, further comprising receiving network configuration information including an indication of a different frequency sub-band with lower CLI for receiving one or more communication signals on the DL channel.

14. The method of claim 10, wherein determining the quality of the DL channel exceeds the minimum threshold comprises:
    determining a received power associated with at least one reference signal from the network entity is greater than a minimum power threshold.

15. The method of claim 10, wherein the CLI reference signal comprises at least one of a sounding reference signal (SRS) and an uplink demodulation reference signal (DMRS).

* * * * *